(12) United States Patent
Friebel et al.

(10) Patent No.: US 11,198,614 B2
(45) Date of Patent: *Dec. 14, 2021

(54) TRANSITION METAL CYANIDE COORDINATION COMPOUNDS HAVING MULTIPLE REACTIONS

(71) Applicant: Natron Energy, Inc., Santa Clara, CA (US)

(72) Inventors: Daniel Friebel, San Carlos, CA (US); Ali Firouzi, Saratoga, CA (US); Vanessa Garcia, Palo Alto, CA (US); Xiongfei Shen, Fremont, CA (US); Colin Deane Wessells, Menlo Park, CA (US)

(73) Assignee: Natron Energy, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/675,170

(22) Filed: Nov. 5, 2019

(65) Prior Publication Data

US 2020/0071175 A1 Mar. 5, 2020

Related U.S. Application Data

(60) Continuation-in-part of application No. 16/569,249, filed on Sep. 12, 2019, now Pat. No. 10,597,304, (Continued)

(51) Int. Cl.
*C01C 3/11* (2006.01)
*C01G 45/00* (2006.01)
(Continued)

(52) U.S. Cl.
CPC .................. *C01C 3/11* (2013.01); *C01C 3/12* (2013.01); *C01G 45/006* (2013.01); *H01M 4/58* (2013.01);
(Continued)

(58) Field of Classification Search
CPC ........... C01C 3/11; C01C 3/12; C01G 45/006; H01M 4/60; H01M 4/58; H01M 10/05; H01M 10/36
See application file for complete search history.

(56) References Cited

U.S. PATENT DOCUMENTS 9,099,718 B2 8/2015 Lu et al.
9,287,589 B2 3/2016 Wessells et al.
(Continued)

OTHER PUBLICATIONS

Hyun-Wook Lee et al: "Maganese hexacyanomanganate open framework as a high-capacity positive electrode material for sodium-ion batteries", Nature Communications, Nature Publishing Group, United Kingdom, vol. 5, Oct. 14, 2014 (Oct. 14, 2014), pp. 5280-5281, XP002752587, ISSN: 2041-1723, DOI: 10.1038/NCOMMS6280 [retrieved Oct. 14, 2014].

(Continued)

*Primary Examiner* — Stewart A Fraser
(74) *Attorney, Agent, or Firm* — Patent Law Offices Of Michael E. Woods; Michael Woods

(57) ABSTRACT

A system, method, and articles of manufacture for a surface-modified transition metal cyanide coordination compound (TMCCC) composition, an improved electrode including the composition, and a manufacturing method for the composition according to Formula III—An electrochemical cell including a system having an anode, a cathode, and an electrolyte wherein the anode includes a material, including the material including at least one composition represented by Formula III: $A_xMn_y[Mn(CN)_{(6)}]_z(Vac)_{(1-z)} \cdot n(H_2O)m$ (Che) wherein, in Formula III, A includes one or more alkali metals including Na; and wherein $0<j\leq 4$, $0\leq k\leq 0.1$, $1.2<x\leq 4$, $0<y\leq 1$, $0.8<z\leq 1$, $0<n\leq 4$; $0\leq m\leq 0.2$ and wherein $x+2y-4z=0$.

20 Claims, 18 Drawing Sheets

Related U.S. Application Data which is a continuation of application No. 15/859,160, filed on Dec. 29, 2017, now Pat. No. 10,414,666, which is a continuation of application No. PCT/US2016/040209, filed on Jun. 29, 2016, which is a continuation of application No. 14/880,010, filed on Oct. 9, 2015, now Pat. No. 9,359,219, which is a division of application No. 14/755,607, filed on Jun. 30, 2015, now Pat. No. 9,299,981, said application No. PCT/US2016/040209 is a continuation of application No. 14/755,607, filed on Jun. 30, 2015, now Pat. No. 9,299,981.

(51) Int. Cl.
  *C01C 3/12* (2006.01)
  *H01M 4/60* (2006.01)
  *H01M 4/58* (2010.01)
  *H01M 10/05* (2010.01)
  *H01M 10/36* (2010.01)

(52) U.S. Cl.
  CPC .............. *H01M 4/60* (2013.01); *H01M 10/05* (2013.01); *H01M 10/36* (2013.01)

(56) References Cited

U.S. PATENT DOCUMENTS

| | | | |
|---|---|---|---|
| 9,299,981 | B1 | 3/2016 | Motallebi et al. |
| 9,359,219 | B1 | 6/2016 | Motallebi et al. |
| 10,414,666 | B2 | 9/2019 | Motallebi et al. |
| 10,597,303 | B2* | 3/2020 | Motallebi ............... C01C 3/12 |
| 2014/0127560 | A1 | 5/2014 | Wessells et al. |
| 2014/0127592 | A1* | 5/2014 | Wessells ............... H01M 10/04 429/347 |
| 2014/0220392 | A1 | 8/2014 | Wessells et al. |
| 2014/0308544 | A1 | 10/2014 | Wessells et al. |

OTHER PUBLICATIONS

International Search Report for International application No. PCT/US2016/040209 dated Oct. 31, 2016.

Lee, h.-w., et al., "Manganese hexacyanomanganate open framework as a high-capacity positive electrode material for sodium-ion batteries" Nature Communications, 5:5280 (2014).

Mauro Pasta et al: "Full open-framework batteries for stationary energy storage", Nature Communications, vol. 5, Jan. 6, 2014 (Jan. 6, 2014) pp. 3007-1, XP055150480, United Kingdom ISSN: 2041-1723, DOI: 10.1038/ncomms4007.

Pasta, M., et al., "Full open-framework batteries for stationary energy storage" Nature Communications, 5:3007 (2014).

Smith, A. J., et al., "High-Precision Differential Capacity Analysis of LiMn2O4/graphite Cells" Electrochem. Solid-State Lett., 14 (4), A39-A41 (2011).

Written Opinion of the International Searching Authority for International application No. PCT/US2016/040209 dated Oct. 31, 2016.

U.S. Appl. No. 16/569,216, filed Sep. 12, 2019, Shahrokh Motallebi et al.

U.S. Appl. No. 16/569,249, filed Sep. 12, 2019, Shahrokh Motallebi et al.

U.S. Appl. No. 14/755,607, filed Jun. 30, 2015, Shahrokh Motallebi et al.

U.S. Appl. No. 14/880,010, filed Oct. 9, 2015, Shahrokh Motallebi et al.

U.S. Appl. No. 15/859,160, filed Dec. 29, 2017, Shahrokh Motallebi et al.

* cited by examiner

TRANSITION METAL CYANIDE COORDINATION COMPOUNDS HAVING MULTIPLE REACTIONS

CROSS REFERENCE TO RELATED APPLICATIONS

This application is a Continuation-in-part of application Ser. No. 16/569,249 filed on Sep. 12, 2019; application Ser. No. 16/569,249 is a Continuation of application Ser. No. 15/859,160 filed on Dec. 29, 2017; application Ser. No. 15/859,160 is a Continuation of Application PCT/US16/40209 filed on Jun. 29, 2016; Application PCT/US16/40209 is a Continuation of application Ser. No. 14/880,010 filed on Oct. 9, 2015; application Ser. No. 14/880,010 is a Division of application Ser. No. 14/755,607 filed on Jun. 30, 2015; Application PCT/US16/40209 is a Continuation of application Ser. No. 14/755,607 filed on Jun. 30, 2015; the contents of which are all hereby expressly incorporated by reference thereto in their entireties for all purposes.

FIELD OF THE INVENTION

The present invention relates generally to environmental stability of materials useful in electrochemical devices, and more specifically, but not exclusively, to compositions, articles of manufacture, and methods for manufacture of environmentally stabilized electrode active materials, for example stabilization of air sensitive anode active transition metal cyanide coordination compound (TMCCC) materials.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

There is a trend in electrochemical cell design that requires a development of new materials for energy storage technologies to allow for safe, economic and energy efficient batteries. A number of cyanide-based transition metal compounds used as cathodes have been developed for organic and aqueous electrolytes. Very little work to date has been published on cyanide-based transition metal compounds used as anodes, and more specifically, used as anode electrodes in aqueous electrolyte batteries.

Recent developments regarding cyanide-bridged coordination polymer electrodes for aqueous-based electrolyte batteries have revealed promising results. However, many challenges must be have addressed before cyanide-based transition metal compounds may be safely, economically and used in an energy efficiently manner in an anode, especially in an anode operated in an aqueous electrolyte cell. Relatively rapid fade rates of the electrode, as well as difficulties in processing and handling the material in the presence of oxygen are important technical, economic and safety concerns.

For example, manganese hexacyanomanganate anode material is air and moisture sensitive and thus its storage, handling, and processing require a controlled environment in which oxygen and moisture should be absent. Incorporating such a material into a product, like a battery, has an important impact on a cost of fabrication of the battery and renders the material less attractive as an anode active material despite its potential advantages due to its electrochemical properties.

What is needed is a system, method, and articles of manufacture for an improved transition metal cyanide coordination compound (TMCCC) composition, an improved electrode including the composition, and a manufacturing method for the composition.

BRIEF SUMMARY OF THE INVENTION

Disclosed are systems, methods, and articles of manufacture for an improved transition metal cyanide coordination compound (TMCCC) composition, an improved electrode including the composition, and a manufacturing method for the composition.

The following summary of the invention is provided to facilitate an understanding of some of the technical features related to air stabilization of air sensitive materials, and is not intended to be a full description of the present invention. A full appreciation of the various aspects of the invention can be gained by taking the entire specification, claims, drawings, and abstract as a whole. The present invention is applicable to other materials and processes.

Embodiments of the present invention may include a method of reacting an air sensitive material, such as a TMCCC material, that may be used in an electrode of an electrochemical device with one or more chelating agents. A consequence of such a method is that the resulting material demonstrates improved air stability without experiencing an appreciable degradation of the desirable electrochemical and cycle life performance metrics. These chelating agents may include an acid-containing material that interacts with metal ions on a surface of elements of the TMCCC material. The resulting material exhibits diminished reactivity and therefore increased stability within the ambient environment, particularly oxygen and water.

An embodiment of the present invention may include a final composition of matter having a general formula: $A_xM[R(CN)_{6-j}L_j]_z \cdot (Che)_w \cdot nH_2O$, where: A is a cation; M is a metal cation; R is a transition metal cation; L is a ligand that may be substituted in the place of a $CN^-$ ligand and Che is an acid-containing chelating agent.

An embodiment of the present invention may include an electrode in an electrochemical device, the electrode including a final composition of matter having a general formula: $A_xM[R(CN)_{6-j}L_j]_z \cdot (Che)_w \cdot nH_2O$, where: A is a cation; M is a metal cation; R is a transition metal cation; L is a ligand that may be substituted in the place of a $CN^-$ ligand and Che is an acid-containing chelating agent.

An embodiment of the present invention may include a method for manufacturing an environment-stabilized TMCCC material including producing a particulated TMCCC material and then washing the particulated TMCCC material with a solution including a material containing an acid group to produce a stabilized TMCCC material. This stabilized TMCCC material may be used in manufacturing structures useful in electrochemical devices, such as an anode for example, with greatly decreased concerns regarding degradation consequent to exposure to ambient atmosphere.

An embodiment of the present invention may include a composition of matter of the formula I:

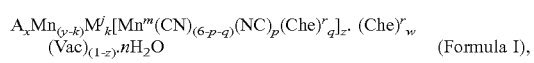

(Formula I), including surface-modified cyanide-bridged coordination polymers having well faceted cubic crystal structures with crystal size of more than 1 micron and having diminished surface reactivity exhibit improved air stability.

An embodiment of the present invention may include transition metal cyanide coordination compounds (TMCCCs) having a specific composition of matter and defect concentration may undergo multiple reversible electrochemical reactions in a narrow range of electrochemical potential. These novel TMCCC materials enable operation of an electrochemical cell in a narrower voltage range and a greater precision to state-of-charge measurement.

A method for manufacturing an environment-stabilized TMCCC material, including a) synthesizing a particulated TMCCC material from a precursor salt, said precursor salt including a transition metal and a first chelation species (Che_I); and thereafter b) combining the particulated TMCCC material with a solution including a second chelation species (Che_II) to produce a stabilized TMCCC, said second chelation species including one or more chemical species selected from the group including a first material including said first chelation species, a second material excluding said first chelation species, and combinations thereof;
wherein said stabilized TMCCC material includes:
at least one composition represented by Formula II:

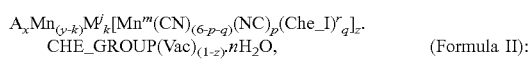

$$A_xMn_{(y-k)}M^j_k[Mn^m(CN)_{(6-p-q)}(NC)_p(Che\_I)^r_q]_z \cdot CHE\_GROUP(Vac)_{(1-z)} \cdot nH_2O, \quad \text{(Formula II):}$$

wherein CHE_GROUP includes one or more chelation materials selected from the group consisting of $(Che\_I)^r_w$, $(Che\_II)^s_v$, and combinations thereof
wherein, in Formula II, each A is an independently selected alkali metal Li, Na, or K; and each dopant M may optionally be at least one independently selected alkaline earth metal Mg or Ca, post-transition metal Al, Ga, In, Sn, or Pb, or transition metal Sc, Ti, V, Cr, Fe, Co, Ni, Cu, Zn, Pd, Ag, or Cd having an average valence j; and Che represents an acid chelating agent which includes ligand binding atoms that form one or more covalent linkages with Mn or with Mn and M; and
wherein $0<j\le4$, $0\le k\le0.1$, $0\le(p+q)\le6$, $0<x\le4$, $0<y\le1$, $0<z\le1$, $0<w\le0.2$; $-3\le r\le3$; $0<v\le0.2$; $-3\le s\le3$; and $0\le n\le6$;
wherein $x+2(y-k)+jk+(m+(r+1)q-6)z+wr+vs=0$; and
wherein Formula I includes one or more $Mn(CN)_{(6-p-q)}(NC)_p(Che\_I)^r_q$ complexes each including an Mn atom, and wherein p is an average number of NC groups found in said one or more $Mn(CN)_{(6-p-q)}(NC)_p(Che\_I)^r_q$ complexes; and
wherein q is an average number of Che_I groups found in said one or more $Mn(CN)_{(6-p-q)}(NC)_p(Che\_I)^r_q$ complexes; and
wherein m is an average valence of said Mn atoms found in said one or more $Mn(CN)_{(6-p-q)}(NC)_p(Che\_I)^r_q$ complexes;
wherein (Vac) identifies a $Mn(CN)_{(6-p-q)}(NC)_p(Che\_I)^r_q$ vacancy;
wherein CN identifies a cyano group; and
wherein NC identifies an isocyano group.

An embodiment of the present invention may include two chelation species (Che_I and Che_II).—for example Che_I is present during a synthesis, so it can be more easily substituted into the hexacyano complexes in quantity q. Che_II, on the other hand, may only be present after the synthesis during a washing step. The specification evidences that Che_II may displace some Che_1 on the surface of the particles (quantity w of Che_I replaced by quantity v of Che_II). It is not believed that it is likely that Che_II could partially or fully displace Che_I in the complexes in quantity q.

An embodiment may include different related products represented by $A_xMn_{(y-k)}M^j_k[Mn^m(CN)_{(6-p-q)}(NC)_p(Che\_I)^r_q]_z \cdot CHE\_GROUP \ (Vac)_{(1-z)} \cdot nH_2O$ wherein the Che_I species is the "in-structure" chelation species present during synthesis and the CHE_GROUP represents chelation species on surface and may include Che_I and/or Che_II.

An embodiment of the present invention may include a method, product, composition allowing for multiple chelation species in Formula_I, including: a) synthesis with Che_I; b) isolation to remove product from synthesis solution; c) washing the isolated product from b) with a solution containing no chelating agents (removes any excess Che_I) which produces a product 1 wherein CHE_GROUP includes only Che_I; d) washing this product 1 with a solution containing Che_II which results in CHE_GROUP at this stage including some or all of Che_II; and e) a final isolation (e.g., filtration) to remove excess Che_II solution, resulting in a product 2 different from product 1 in that CHE_GROUP has Che_II replacing some or all of Che_I on the surface. A variation of this may include a step f) after step a) to add Che_II to the synthesis solution and then followed by a step g) to isolate/wash with a solution containing no chelating agents (similar to step c) which results, broadly, in product 2 with some or all surface Che_I replaced by Che_II.

Embodiments of surface modified cyanide-bridged coordination polymers of the present invention exhibit very good air stability. In some embodiments, a surface oxidation of particles of these materials, upon exposure to air, was negligible even after 60 hours. Comparisons between exposed and unexposed materials to air shows that there is no difference between their electrochemical performances and that there is an order of magnitude improvement of their fade capacity loss compared to other cyanide-based transition metal compounds.

From safety and economic point of view, the ease of preparation and improved air stability of theses novel materials makes them very attractive candidate in the family of cyanide-bridged coordination polymer-based anodes for electrochemical devices, such as battery technology for example.

An electrochemical cell including a system having an anode, a cathode, and an electrolyte wherein the anode includes a material, including the material including at least one composition represented by Formula III: $A_xMn_y[Mn(CN)_6]_z \ (Vac)_{(1-z)} \cdot n(H_2O) \ m(Che)$ Formula III wherein, in Formula III, A includes one or more alkali metals including Na; and wherein $0<j\le4$, $0\le k\le0.1$, $1.2<x\le4$, $0<y\le1$, $0.8<z\le1$, $0<n\le4$; $0\le m\le0.2$ and wherein $x+2y-4z=0$; and wherein the anode includes a concentration of A metals, the concentration of A metals including a first concentration of A metals x1, $x1\ge1.2$; wherein Formula III includes one or more $Mn(CN)_6$ complexes each including an Mn atom; and wherein m is an average valence of the Mn atoms found in the one or more $Mn(CN)_6$ complexes; and wherein (Vac) identifies a $Mn(CN)_6$ vacancy, and wherein each particular $Mn(CN)_6$ complex includes the Mn atom bonded to a plurality of cyanide groups; and wherein (Che) identifies a chelating group; wherein an electrochemical charging of the system is configured to reduce one or more hexacyanomanganate groups from a discharged state of $Mn^{II}(CN)_6$ to a charged state of $Mn^I(CN)_6$, and wherein the electrochemical charging proceeds by a plurality of electrochemical charging reactions, including a first electrochemical charging reaction configured to increase the concentration of A metals to a second concentration of A metals x2, where x2>x1, followed by a second electrochemical charging reaction configured to increase the concentration of A metals to a third concentration of A metals x3, where x3>x2.

A method for operating an electrochemical cell having a system, the system including an anode, a cathode, and an electrolyte wherein the anode includes a material having at least one composition represented by Formula III: $A_xMn_y$[Mn(CN)$_{(6)}$]$_z$ (Vac)$_{(1-z)}$·n(H$_2$O) m(Che) Formula III, including reducing one or more hexacyanomanganate groups of the material from a discharged state of $Mn^{II}(CN)_6$ to a charged state of $Mn^{I}(CN)_6$, using a first electrochemical charging reaction followed by a second electrochemical charging reaction, with the first electrochemical charging reaction increasing a concentration of A metals from a first concentration of A metals x1, x1≥1.2 to a second concentration of A metals x2 with x2>x1, and with the second electrochemical charging reaction increasing the concentration of A metals to a third concentration of A metals x3, where x3>x2.

These materials can be used in electrodes for electrochemical energy storage devices such as batteries. These batteries can be used for applications including stationary storage, vehicles, and portable electronics. These materials can also be used as electrochromic electrodes in electrochromic devices.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 1a illustrates an SEM image of an oxalic acid surface-modified TMCCC material after exposure to air for 0 hours;

FIG. 1b illustrates an SEM image of an oxalic acid surface-modified TMCCC material after exposure to air for 2 hours;

FIG. 1c illustrates an SEM image of an oxalic acid surface-modified TMCCC material after exposure to air for 10 hours; and FIG. 1d illustrates an SEM image of an oxalic acid surface-modified TMCCC material after exposure to air for 60 hours;

FIG. 2a illustrates an SEM image of a surface-unmodified TMCCC material after exposure to air for 2 hours;

FIG. 2b illustrates an SEM image of a surface-modified TMCCC material (with citric acid) after exposure to air for 2 hours;

FIG. 2c illustrates an SEM image of a surface-modified TMCCC material (with malic acid) after exposure to air for 10 hours; and FIG. 2d illustrates an SEM image of a surface-modified TMCCC material (with sodium glycinate) after exposure to air for 10 hours.

DETAILED DESCRIPTION OF THE INVENTION

Figure 1A:
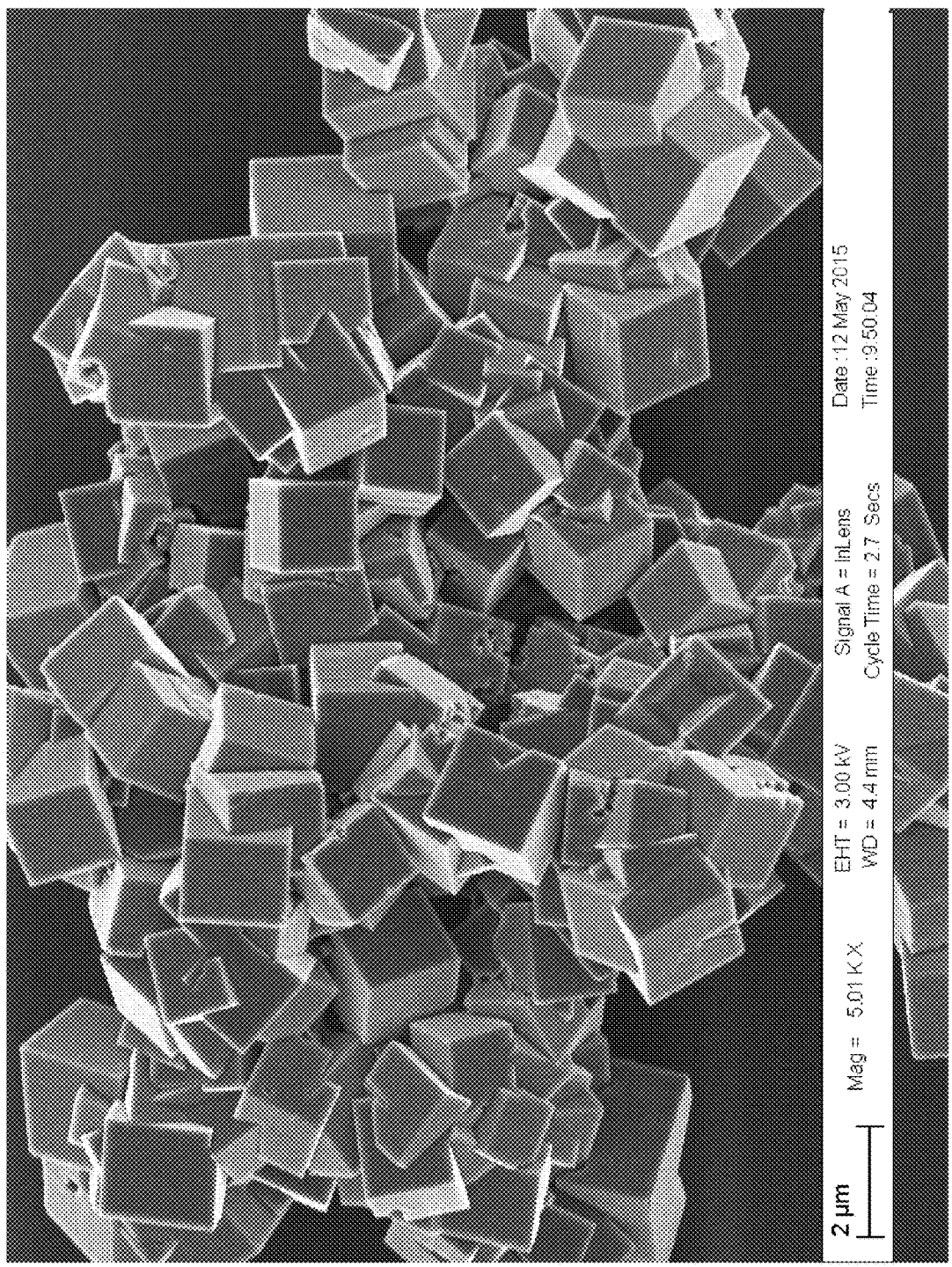
FIG. 1a-FIG. 1d illustrate a set of scanning electron microscopy (SEM) images of oxalic acid surface-modified materials at different exposure time to air.

Embodiments of the present invention provide systems, methods, and articles of manufacture for an improved transition metal cyanide coordination compound (TMCCC) composition, an improved electrode including the composition, and a manufacturing method for the composition. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Definitions

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The following definitions apply to some of the aspects described with respect to some embodiments of the invention. These definitions may likewise be expanded upon herein.

As used herein, the term "or" includes "and/or" and the term "and/or" includes any and all combinations of one or more of the associated listed items. Expressions such as "at least one of," when preceding a list of elements, modify the entire list of elements and do not modify the individual elements of the list.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise. It will be understood that when an element is referred to as being "on" another element, it can be directly on the other element or intervening elements may be present therebetween. In contrast, when an element is referred to as being "directly on" another element, there are no intervening elements present.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking. Coupled objects can be directly connected to one another or can be indirectly connected to one another, such as via an intermediary set of objects.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

As used herein, the terms "optional" and "optionally" mean that the subsequently described event or circumstance may or may not occur and that the description includes instances where the event or circumstance occurs and instances in which it does not.

As used herein, the term "size" refers to a characteristic dimension of an object. Thus, for example, a size of an object that is spherical can refer to a diameter of the object. In the case of an object that is non-spherical, a size of the non-spherical object can refer to a diameter of a corresponding spherical object, where the corresponding spherical object exhibits or has a particular set of derivable or measurable properties that are substantially the same as those of the non-spherical object. Thus, for example, a size of a non-spherical object can refer to a diameter of a corresponding spherical object that exhibits light scattering or other properties that are substantially the same as those of the non-spherical object. Alternatively, or in conjunction, a size of a non-spherical object can refer to an average of various orthogonal dimensions of the object. Thus, for example, a size of an object that is a spheroidal can refer to an average of a major axis and a minor axis of the object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

Figure 1B:
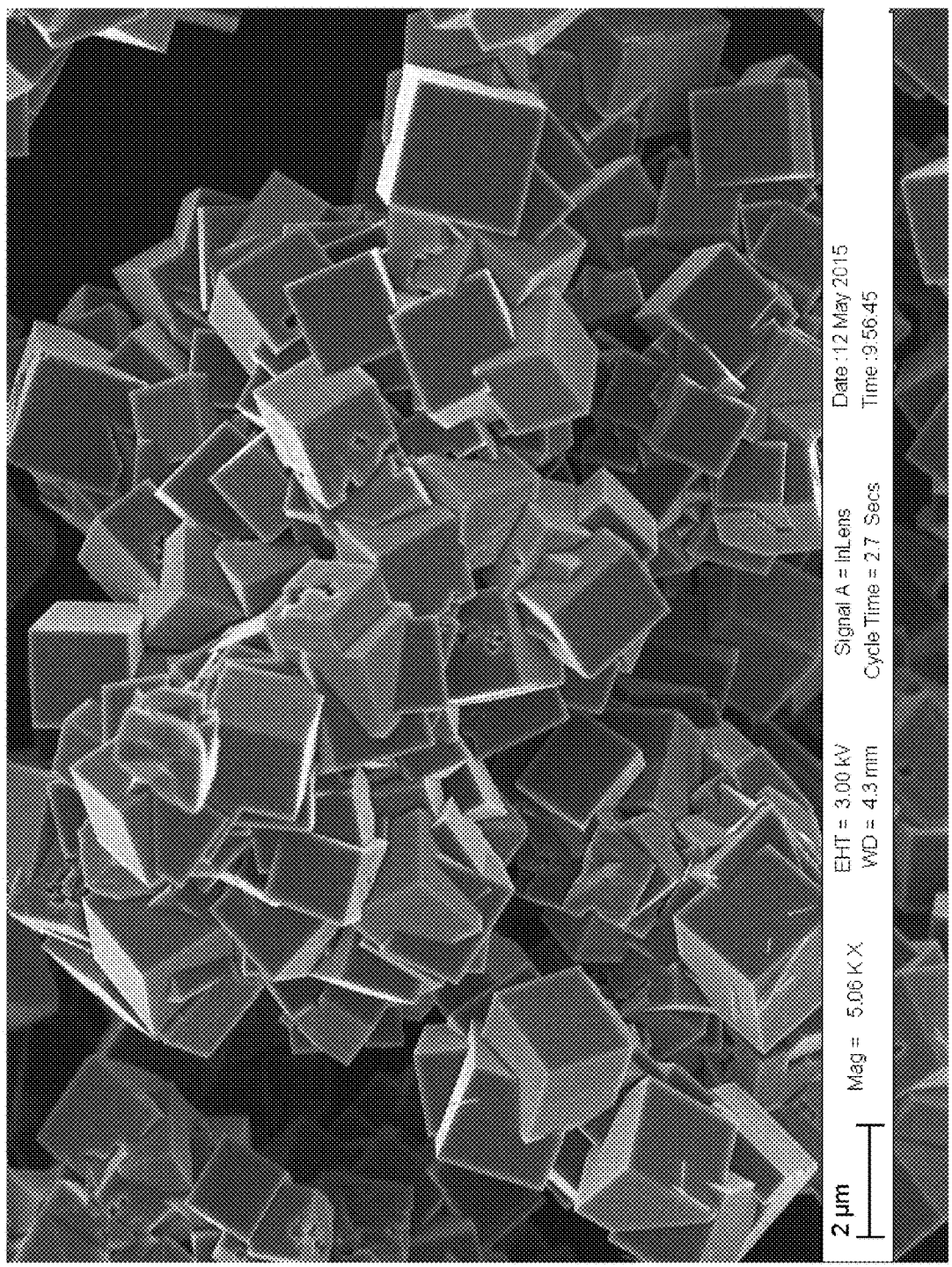
Figure 1C:
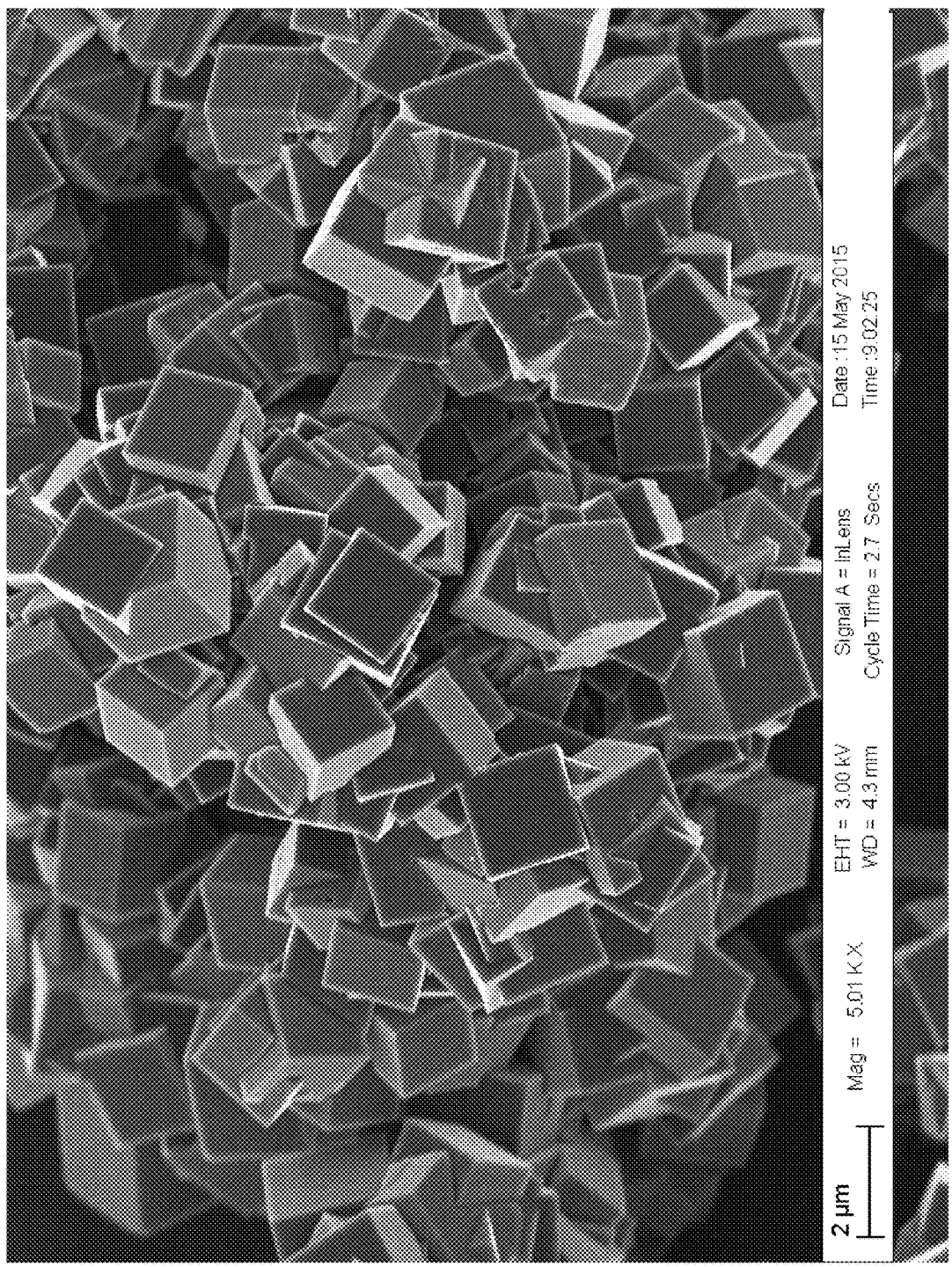
Figure 1D:
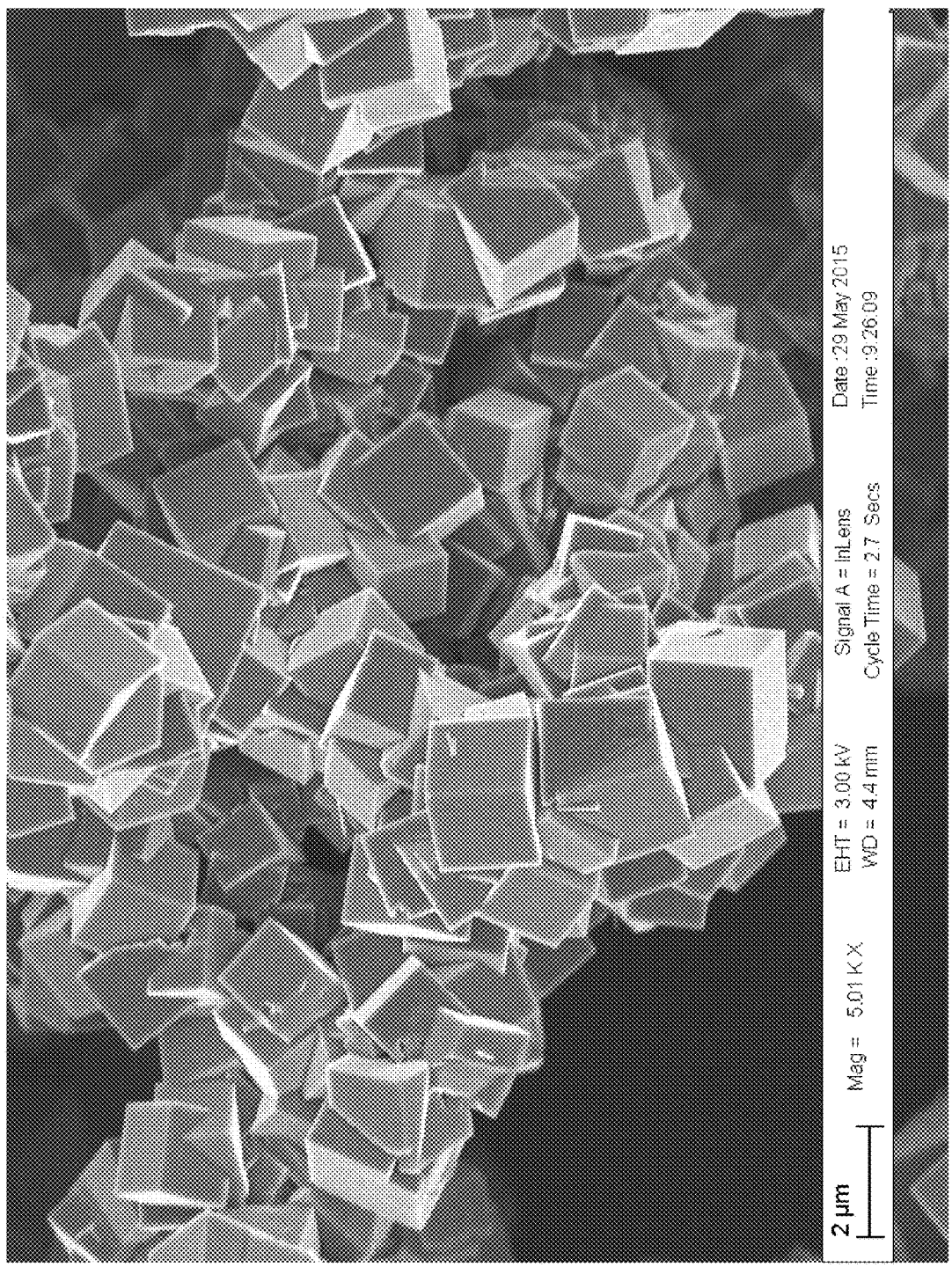

FIG. 1a-FIG. 1d illustrate a set of scanning electron microscopy (SEM) images of oxalic acid surface-modified materials at different exposure time to air; FIG. 1a illustrates an SEM image of an oxalic acid surface-modified TMCCC material after exposure to air for 0 hours; FIG. 1b illustrates an SEM image of an oxalic acid surface-modified TMCCC material after exposure to air for 2 hours; FIG. 1c illustrates an SEM image of an oxalic acid surface-modified TMCCC material after exposure to air for 10 hours; and FIG. 1d illustrates an SEM image of an oxalic acid surface-modified TMCCC material after exposure to air for 60 hours.

Figure 2A:
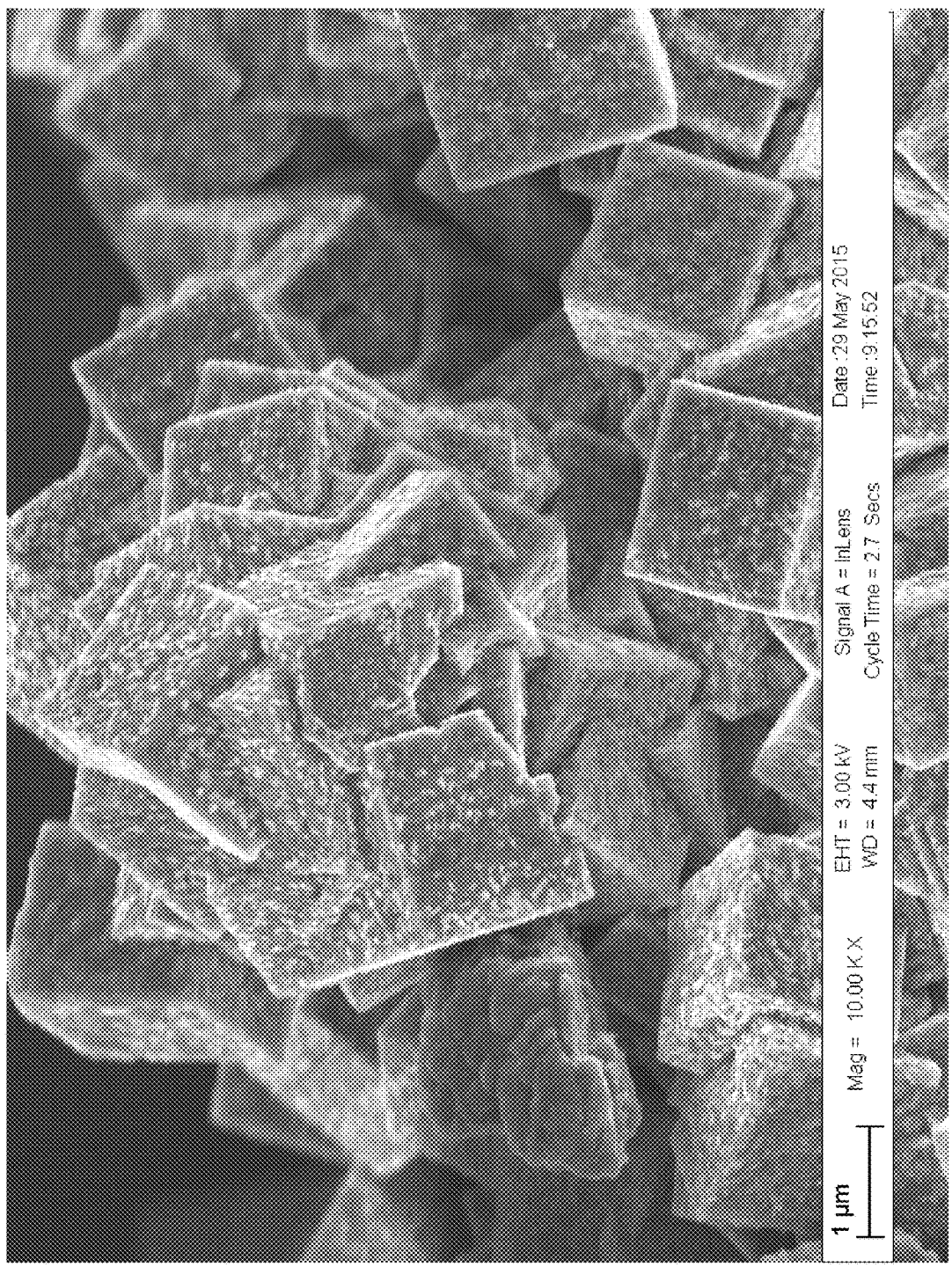
FIG. 2a-FIG. 2d illustrate a set of scanning electron microscopy (SEM) images of surface-modified versus surface-unmodified TMCCC materials exposed to air.
Figure 2B:
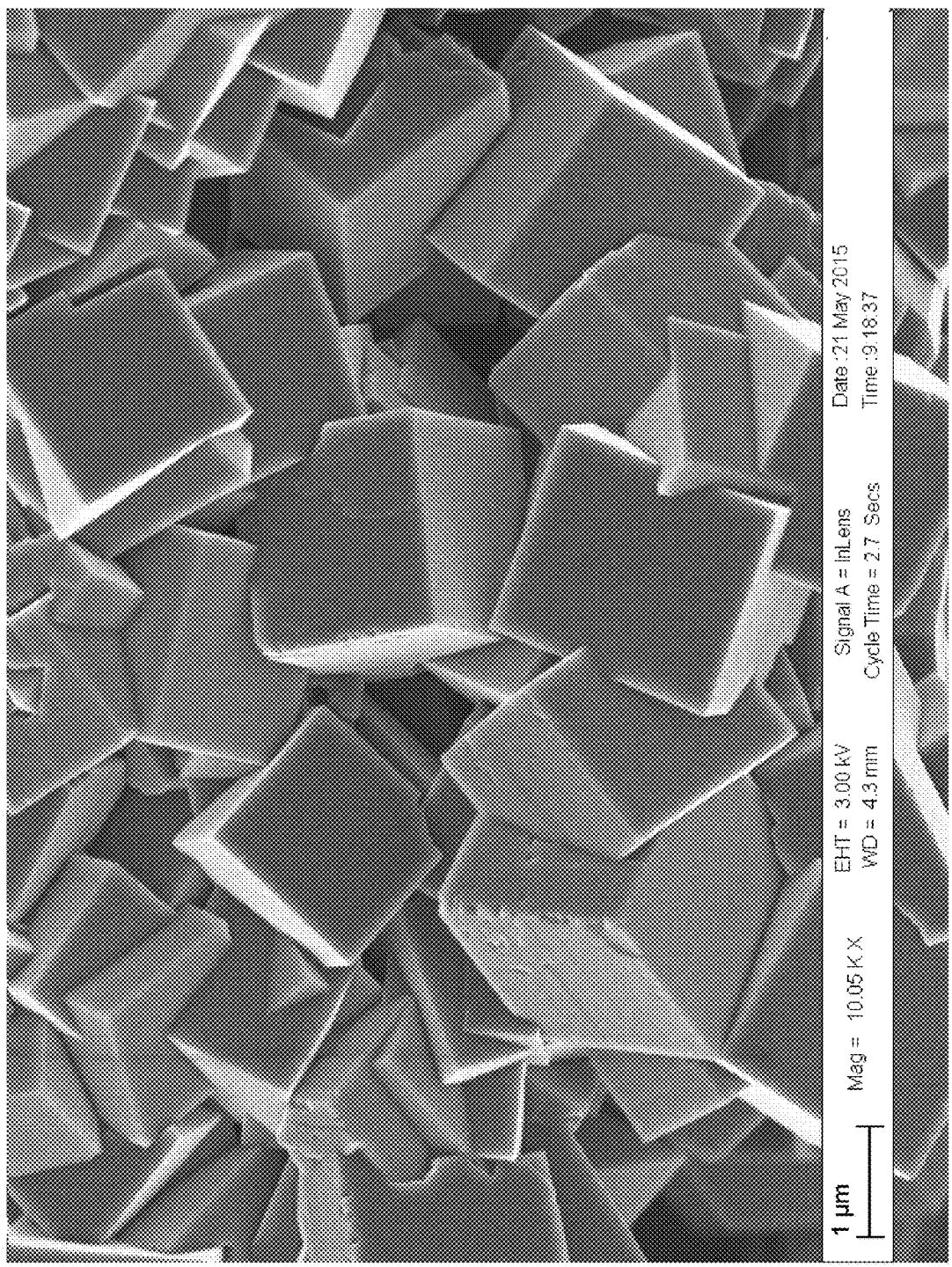
Figure 2C:
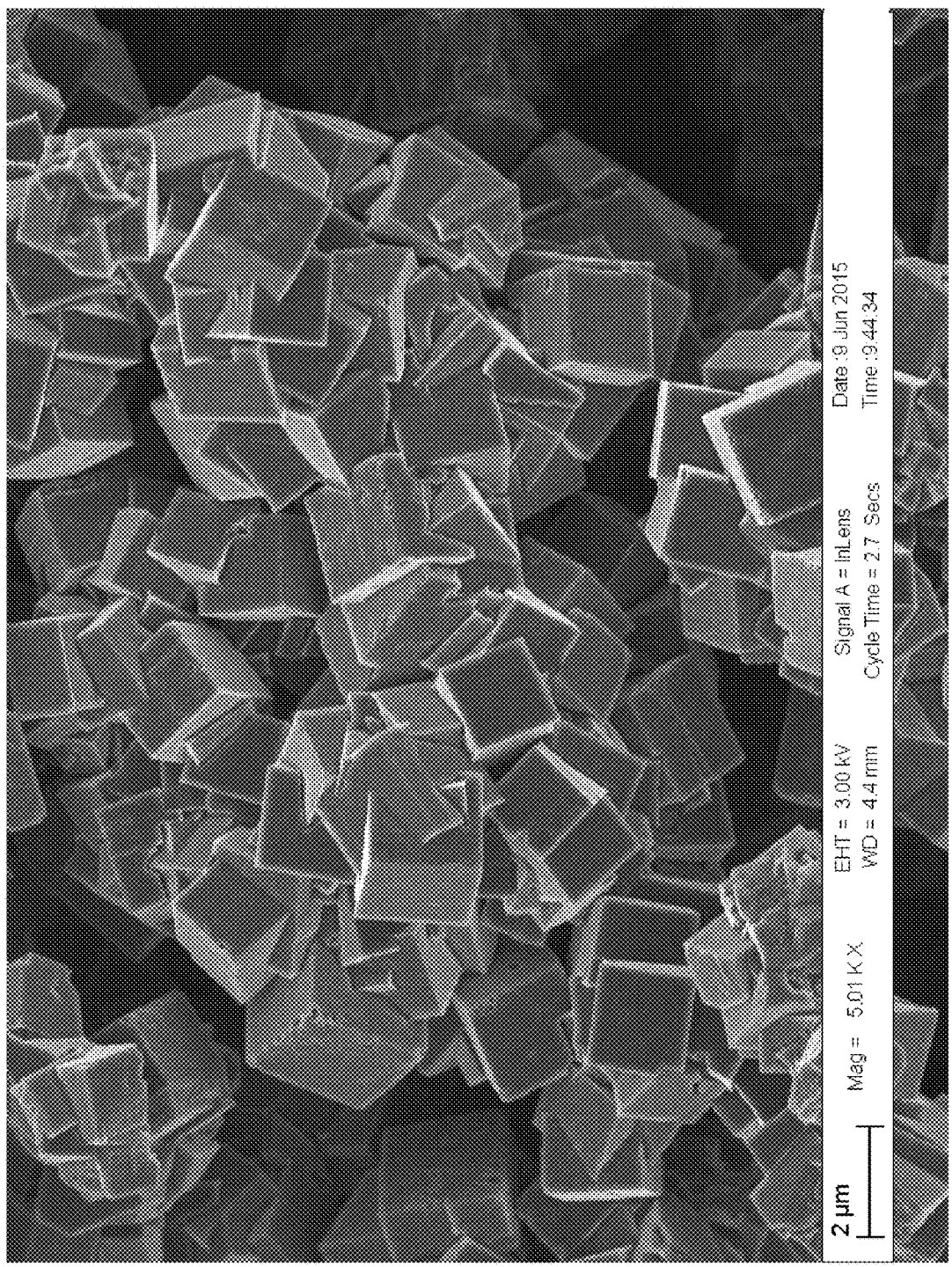
Figure 2D:
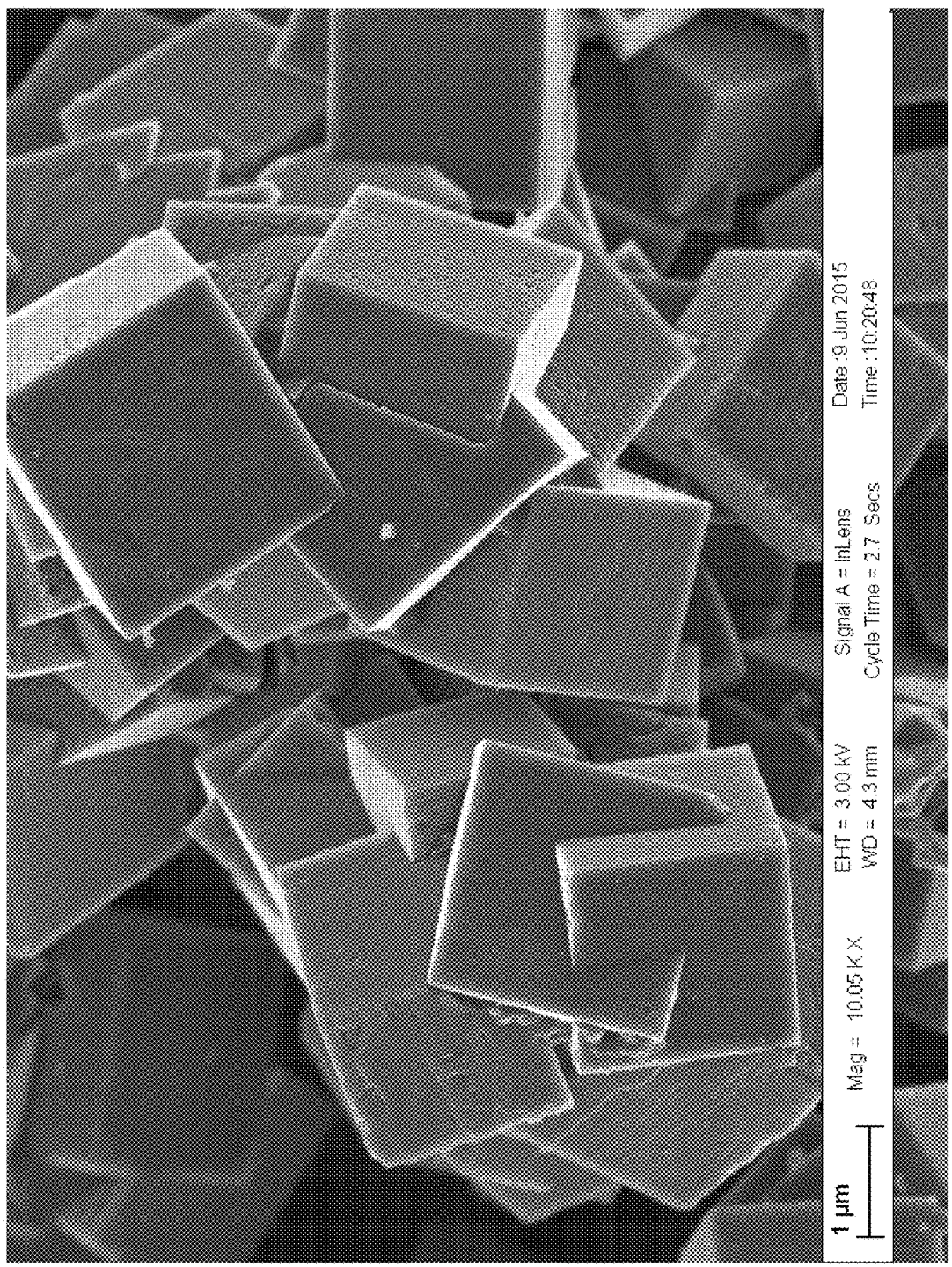

FIG. 2a-FIG. 2d illustrate a set of scanning electron microscopy (SEM) images of surface-modified versus surface-unmodified TMCCC materials exposed to air; FIG. 2a illustrates an SEM image of a surface-unmodified TMCCC material after exposure to air for 2 hours; FIG. 2b illustrates an SEM image of a surface-modified TMCCC material (with citric acid) after exposure to air for 2 hours; FIG. 2c illustrates an SEM image of a surface-modified TMCCC material (with malic acid) after exposure to air for 10 hours; and FIG. 2d illustrates an SEM image of a surface-modified TMCCC material (with sodium glycinate) after exposure to air for 10 hours.

Figure 3:
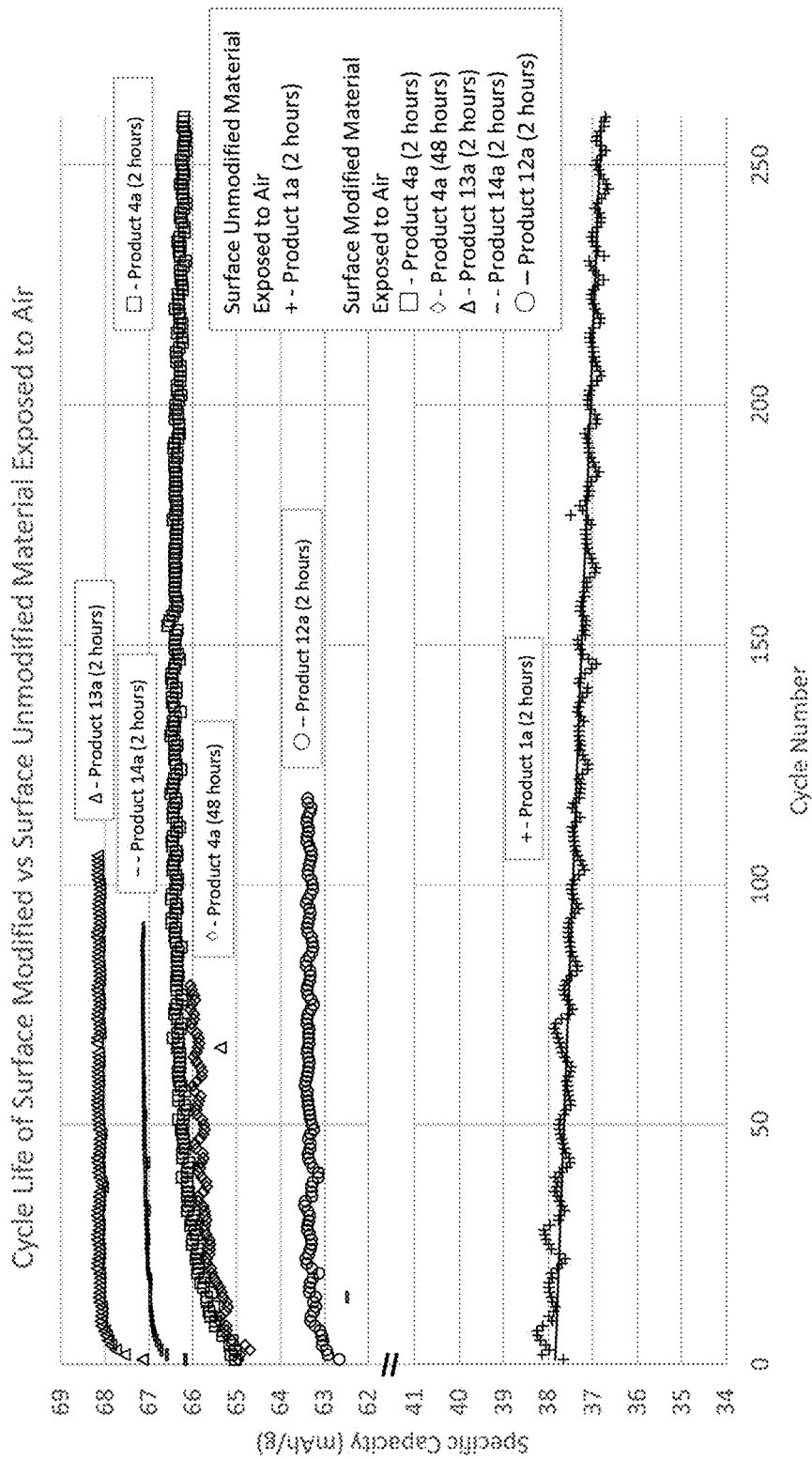
FIG. 3 illustrates a cycle life of electrodes made of surface-modified TMCCC materials and surface-unmodified TMCCC materials exposed to air.

FIG. 3 illustrates a cycle life of electrodes made of surface-modified TMCCC materials and surface-unmodified TMCCC materials exposed to air.

Figure 4:
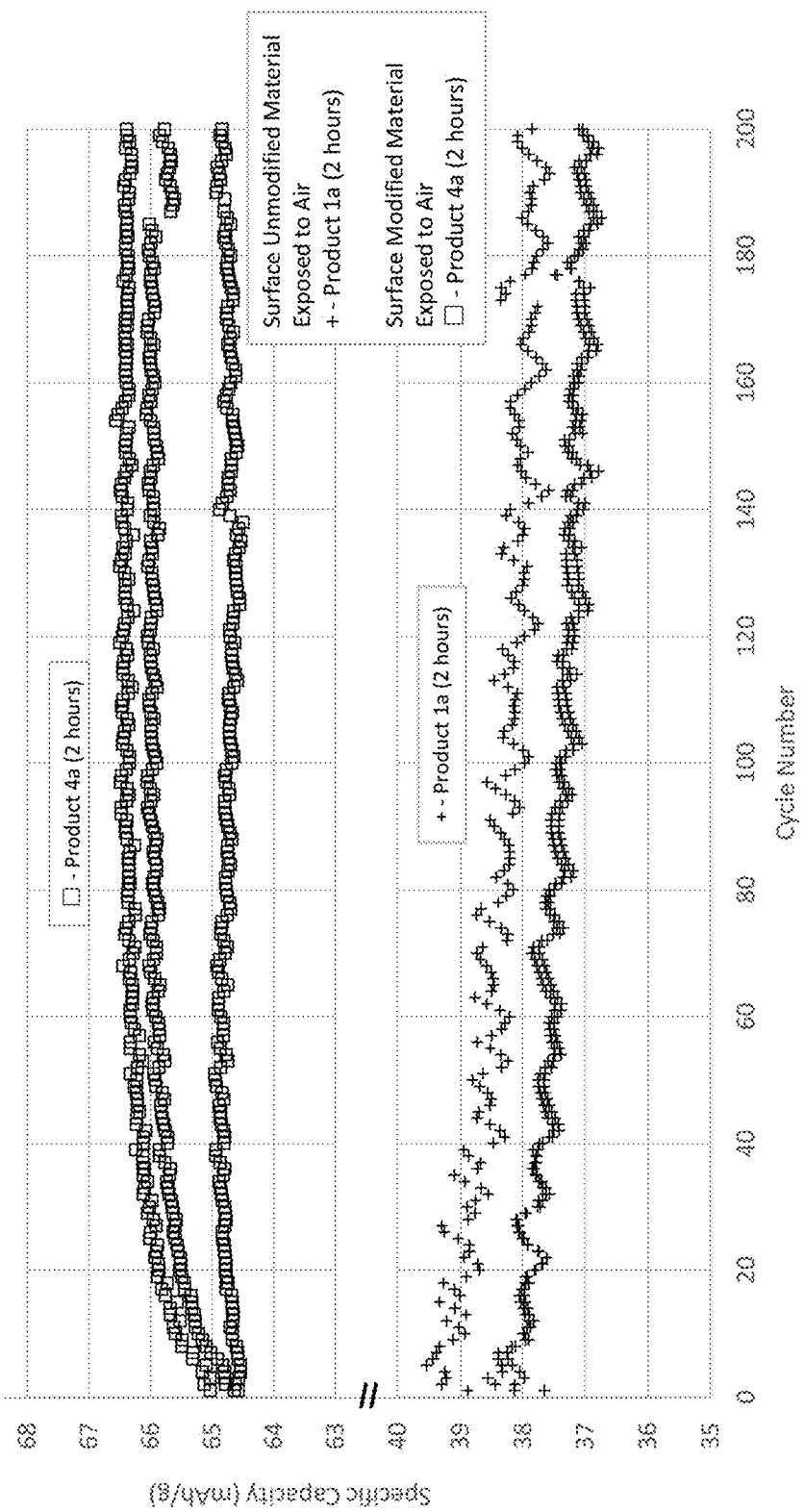
FIG. 4 illustrates a cycle life of oxalic acid surface-modified TMCCC materials and surface-unmodified TMCCC materials after 2 hours exposure to air.

FIG. 4 illustrates a cycle life of oxalic acid surface-modified TMCCC materials and surface-unmodified TMCCC materials after 2 hours exposure to air.

Some embodiments of the present invention may be intended to overcome ambient atmosphere stability problems and may include surface-modified cyanide-bridged coordination polymers anodes for use in batteries, and more specifically, to electrodes including anodes having improved air stability, fade rate and excellent energy efficiency.

It is known that cyanide-bridged coordination polymers are capable of storing ions exchanged in electrochemical processes for the storage and extraction of electrical energy. Ion insertion/extraction accompanied by oxidation-reduction of these coordination polymers make these materials good candidates as electrode compounds in rechargeable batteries.

The ion storage efficiency of the cyanide-bridged coordination polymers is related to its structure and, in theory, the Perovskite-type structure $A_2M^{II}[M'^{II}(CN)_6]$ (where A is an alkali cation and M and M' are transition metals) is the structure which provides the highest electrode efficiency. However, it has been demonstrated that preparation of Perovskite-type structural framework is not a trivial process and this is specifically true for air sensitive alkali cation salts of Manganese (II) hexacyanomanganate compounds that may be included in embodiments of the present invention.

A cyanide-bridged coordination polymer embodiment of the present invention may be represented by the formula I:

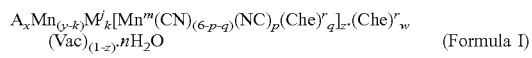

$$A_xMn_{(y-k)}M^j_k[Mn'''(CN)_{(6-p-q)}(NC)_p(Che)^r_q]_z \cdot (Che)^r_w$$
$$(Vac)_{(1-z)} \cdot nH_2O \quad \text{(Formula I)}$$

wherein, in Formula I, each A is an independently selected alkali metal Li, Na, or K; and each dopant M may optionally be at least one independently selected alkaline earth metal Mg or Ca, post-transition metal Al, Ga, In, Sn, or Pb, or transition metal Sc, Ti, V, Cr, Fe, Co, Ni, Cu, Zn, Pd, Ag, or Cd having an average valence j; and Che represents an organic acid chelating agent which possesses ligand binding atoms that form one or more covalent linkages with Mn or with Mn and M, and wherein $0<j\le4$, $0\le k\le0.1$, $0\le(p+q)<6$, $0<x\le4$, $0<y\le1$, $0<z\le1$, $0<w\le0.2$ and $0\le n\le6$; $-3\le r\le3$; wherein $x+2(y-k)+jk+(m+(r+1)q-6)z+wr=0$; and wherein Formula I includes one or more $Mn(CN)_{(6-p-q)}(NC)_p(Che)^r_q$ complexes each including an Mn atom, and wherein p is an average number of NC groups found in said one or more $Mn(CN)_{(6-p-q)}(NC)_p(Che)^r_q$ complexes; and wherein q is an average number of Che groups found in said one or more $Mn(CN)_{(6-p-q)}(NC)_p(Che)^r_q$ complexes; and wherein m is an average valence of said Mn atoms found in said one or more $Mn(CN)_{(6-p-q)}(NC)_p(Che)^r_q$ complexes; and wherein (Vac) identifies a $Mn(CN)_{(6-p-q)}(NC)_p(Che)^r_q$ vacancy.

Some embodiments of the cyanide-bridged coordination polymers of the present invention may have a very well faceted cubic crystal structures with crystal size of more than 1 micron. A chemical treatment of these particles, by simple and straightforward ligand exchange procedures by which the metal ions on the surface of the particles are bound by a strong chelating agent, provide materials with diminished surface reactivity and thus improved air stability.

The enhanced air stability of the materials of some embodiments of the present invention and the possibility of handling and processing them in air rather than in a controlled inert atmosphere makes these materials very attractive as electrode components in rechargeable batteries.

Processes for preparing these products are described in examples 4-15 of the experimental section below. A preferred method of preparation corresponds to a molar ratio of sodium cyanide to manganese (II) salt of more than 3 to 1. A most preferred molar ratio of sodium cyanide to manganese (II) salt is ranged from 3.0 to 1.0 to 3.3 to 1.0. A preferred manganese (II) salt is manganese (II) acetate hydrates. Preferred solvents include ethanol, methanol, and water, and their mixtures. A most preferred solvent is water. A temperature at which the reaction is carried out is ranged from 5 degrees Celsius to 40 degrees Celsius. A preferred temperature range is between 5 to 20 degrees Celsius. A preferred addition sequence is an addition of sodium cyanide solution to manganese (II) salt solution. An addition rate is preferred to be between approximately 1 min to 1 hour. A preferred addition rate is fast addition between 1 min to 20 min. Sodium cyanide is used as solid or in solution in water from concentration between 1.0 to 45.0 wt/wt %. A preferred concentration of sodium cyanide solution is between 15 to 20 wt/wt % in water. A preferred concentration of manganese (II) acetate hydrate in water is between 5 to 30 wt/wt %. A more preferred manganese (II) acetate hydrate in water is between 15 to 20 wt/wt %.

A composition including an embodiment of the present invention may correspond to a composition used for preparation of an anode electrode. This composition corresponds to a slurry or ink applied on a current collector. A composition corresponds to a mixture of an embodiment of the present invention, a binder, an electrical conductive material, additives and a solvent. The binder may be one or more components selected from the group consisting of a vinylfluoride/hexafluoropropylene copolymer, polyvinylidenefluoride (PVDF), polyacrylonitrile, polymethylmethacrylate, polytetrafluoroethylene, a mixture thereof, and styrene butadiene rubber-based polymer. The electrical conductive material may be selected from a crystalline carbon, an amorphous carbon, or a mixture thereof. The conductive material may be selected from acetylene black, ketjen black, natural graphite, artificial graphite, carbon black, carbon fiber, carbon nanotubes and graphene.

A solvent may be selected from solvents such as N-methylpyrrolidinone, N,N-dimethyformamide, dimethyl acetamide and dimethylsufoxide. The preferred solvent is N-methylpyrrolidinone.

Electrodes Preparation:

Manganese (II) hexacyanomanganate (II) salt selected from one of the examples disclosed herein was thoroughly mixed with carbon black (Timcal super C65) by grinding in a mortar pestle. A resulting grey powder was then mixed with a solution of polyvinylidene fluoride (Kynar HSV900) in N-methyl-2-pyrolidinone to produce a slurry. A mass ratio of active material, carbon black and polyvinylidene fluoride was 80:10:10. A thin layer of the thus obtained slurry was coated on a carbon cloth current collector to provide an electrode (intended to be an anode electrode) that was dried under vacuum. The resulting anode electrode is used without further treatment in electrochemical cell setups including the following air stability tests.

Air Stability Tests:

The products 1a-15a of the experimental section below were exposed to air for 2.0 hr to 60.0 hr and the resulting exposed powders were used in electrodes preparation as described above. The electrochemical properties of these materials after exposure to air were compared to their corresponding unexposed materials.

Analysis by Scanning Electron Microscopy (SEM) provided some evidence about the extent of surface protection of the particles against oxidation and decomposition. (See FIG. 1a-FIG. 1d and FIG. 2a-FIG. 2d). FIG. 1a-FIG. 1d illustrate SEM images of oxalic acid surface-modified materials at different exposure time to air. These SEM images clearly show that these particles are pristine with no evidence of surface oxidation even after 60 hours exposure time to air.

FIG. 2a illustrates SEM images of surface-unmodified material exposed to air for 2.0 hours with clear evidence of surface oxidation of particles resulting in formation of white spots and roughening of the surface. In contrast, FIG. 2b-FIG. 2d illustrate surface modified particles resulting from citric acid, malic acid and sodium glycinate treatments, respectively, show no evidence of surface oxidation or decomposition after 2 hours (FIG. 2b) and 10 hours (FIG. 2c and FIG. 2d) of exposure to air.

FIG. 3 illustrates a cycle life of electrodes made of surface-modified and surface-unmodified materials exposed to air. Comparisons between surface-modified and surface-unmodified materials shows that all the surface-modified materials retain their capacity after more than 250 cycles whereas the surface-unmodified material shows a noticeable capacity loss after 250 cycles.

FIG. 4 illustrates a cycle life of oxalic acid surface-modified materials and surface-unmodified materials after 2 hours exposure to air. Comparisons between oxalic acid surface-modified and surface-unmodified materials shows that surface-modified materials retain their capacity after 200 cycles whereas the surface-unmodified material shows a noticeable capacity loss after 200 cycles.

Table I shows a significant oxidation and capacity loss of surface unmodified materials after 2.0 hours exposure to air.

TABLE I

Electrochemical Analysis of Surface-Unmodified Materials Exposed to Air for 2 Hours

| Product # | Initial Open Circuit Voltage (V vs. Ag/AgCl) | | Cycle 5 Specific Capacity (mAh/g) | |
|---|---|---|---|---|
| | 0 Hours air Exposure | 2 Hours Air Exposure | 0 Hours air Exposure | 2 Hours Air Exposure |
| 1a. | −0.310 | −0.194 | 67.88 | 51.73 |
| 2a. | −0.319 | −0.157 | 64.52 | 31.09 |
| 3a. | −0.260 | −0.218 | 66.00 | 55.37 |

Table II shows a result of an electrochemical analysis of surface-modified materials after exposure to air and the evidence of protection of their surfaces against oxidation and remarkable retention of their specific capacities.

TABLE II

Electrochemical Analysis of Surface-Modified Materials After Exposure to Air

| Product # | Initial Open Circuit Voltage (V vs. Ag/AgCl) | | | Cycle 5 Specific Capacity (mA/g) | | |
|---|---|---|---|---|---|---|
| | 0 Hours Air Exposure | 2 Hours Air Exposure | 10 Hours Air Exposure | 0 Hours Air Exposure | 2 Hours Air Exposure | 10 Hours Air Exposure |
| 4a. | −0.283 | −0.281 | | 62.51 | 64.82 | |
| 5a. | −0.352 | −0.257 | −0.230 | 64.91 | 67.34 | 63.12 |
| 6a. | −0.348 | −0.251 | −0.223 | 65.61 | 67.88 | 61.26 |
| 7a. | −0.327 | −0.253 | −0.198 | 62.21 | 62.20 | 59.70 |
| 8a. | −0.360 | −0.240 | −0.222 | 66.75 | 59.17 | 60.32 |
| 9a. | −0.328 | | −0.230 | 67.72 | | 63.96 |
| 10a | −0.310 | | −0.232 | 69.42 | | 63.51 |
| 11a. | −0.353 | −0.233 | | 66.77 | 61.80 | |
| 12a. | −0.285 | −0.223 | | 66.26 | 62.03 | |
| 13a. | −0.261 | −0.257 | −0.237 | 68.03 | 66.95 | 65.57 |
| 14a. | −0.292 | −0.287 | −0.239 | 71.67 | 66.05 | 65.03 |

Table III shows that oxalic acid surface modification of the particles resulted in remarkable inhibition of surface oxidation of the particles with significant retention of specific capacity.

TABLE III

Electrochemical Analysis of Oxalic Acid Surface-Modified Material After Exposure to Air

| Product 4a Time Exposure (mins) | Initial Open Circuit Voltage (V vs. Ag/AgCl) | Cycle 5 Specific Capacity (mA/g) |
|---|---|---|
| 120 | −0.281 | 64.82 |
| 1800 | −0.248 | 60.69 |
| 2880 | −0.241 | 63.89 |
| 3600 | −0.223 | 64.09 |

Figure 5:
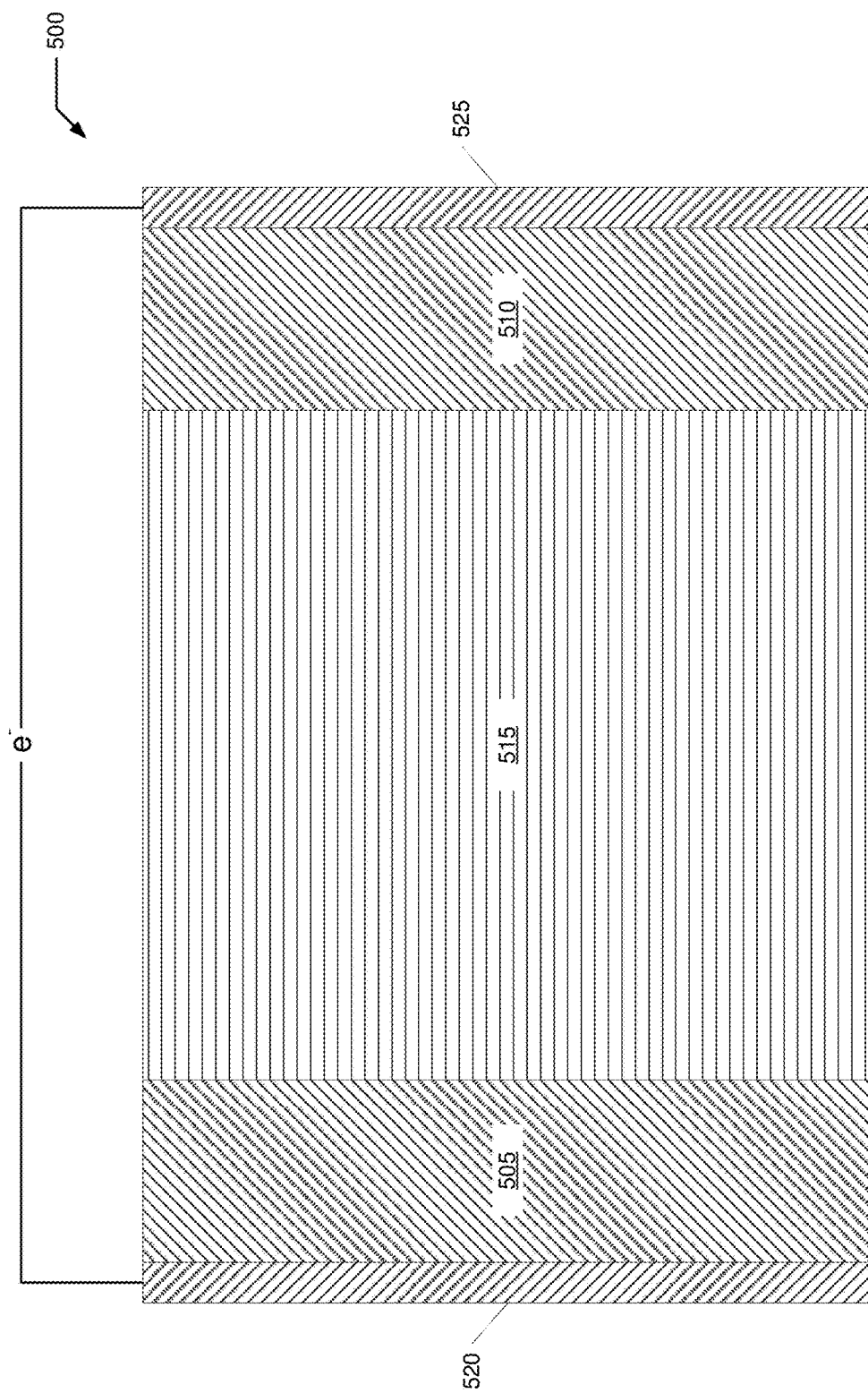
FIG. 5 illustrates a representative secondary electrochemical cell schematic having one or more surface-modified TMCCC electrodes disposed in contact with an electrolyte.

FIG. 5 illustrates a representative secondary electrochemical cell 500 schematic having one or more surface-modified TMCCC electrodes disposed in contact with an electrolyte as described herein. Cell 500 includes a negative electrode 505, a positive electrode 510 and an electrolyte 515 electrically communicated to the electrodes. One or both of negative electrode 505 and positive electrode 510 include TMCCC as an electrochemically active material. A negative current collector 520 including an electrically conductive material conducts electrons between negative electrode 505 and a first cell terminal (not shown). A positive current collector 525 including an electrically conductive material conducts electrons between positive electrode 510 and a second cell terminal (not shown). These current collectors permit cell 500 to provide electrical current to an external circuit or to receive electrical current/energy from an external circuit during recharging. In an actual implementation, all components of cell 500 are appropriately enclosed, such as within a protective housing with current collectors externally accessible. There are many different options for the format and arrangement of the components across a wide range of actual implementations, including aggregation of multiple cells into a battery among other uses and applications.

A method for manufacturing an environment-stabilized TMCCC material, including a) synthesizing a particulated TMCCC material from a precursor salt, said precursor salt including a transition metal and a first chelation species (Che_I); and thereafter b) combining the particulated TMCCC material with a solution including a second chelation species (Che_II) to produce a stabilized TMCCC, said second chelation species including one or more chemical species selected from the group including a first material including said first chelation species, a second material excluding said first chelation species, and combinations thereof;
wherein said stabilized TMCCC material includes:
at least one composition represented by Formula II:

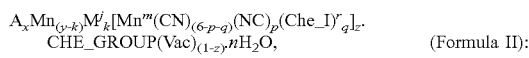
CHE_GROUP(Vac)$_{(1-z)}$·nH$_2$O,     (Formula II):

wherein CHE_GROUP includes one or more chelation materials selected from the group consisting of (Che_I)$^r_w$, (Che_II)$^s_v$, and combinations thereof
wherein, in Formula II, each A is an independently selected alkali metal Li, Na, or K; and each dopant M may optionally be at least one independently selected alkaline earth metal Mg or Ca, post-transition metal Al, Ga, In, Sn, or Pb, or transition metal Sc, Ti, V, Cr, Fe, Co, Ni, Cu, Zn, Pd, Ag, or Cd having an average valence j; and Che represents an acid chelating agent which includes ligand binding atoms that form one or more covalent linkages with Mn or with Mn and M; and
wherein $0<j\leq4$, $0\leq k\leq0.1$, $0\leq(p+q)\leq6$, $0<x\leq4$, $0<y\leq1$, $0<z\leq1$, $0<w\leq0.2$; $-3\leq r\leq3$; $0<v\leq0.2$; $-3\leq s\leq3$; and $0\leq n\leq6$;
wherein $x+2(y-k)+jk+(m+(r+1)q-6)z+wr+vs=0$; and
wherein Formula II includes one or more Mn(CN)$_{(6-p-q)}$(NC)$_p$(Che_I)$^r_q$ complexes each including an Mn atom, and
wherein p is an average number of NC groups found in said one or more Mn(CN)$_{(6-p-q)}$(NC)$_p$(Che_I)$^r_q$ complexes; and
wherein q is an average number of Che_I groups found in said one or more Mn(CN)$_{(6-p-q)}$(NC)$_p$(Che_I)$^r_q$ complexes; and
wherein m is an average valence of said Mn atoms found in said one or more Mn(CN)$_{(6-p-q)}$(NC)$_p$(Che_I)$^r_q$ complexes;
wherein (Vac) identifies a Mn(CN)$_{(6-p-q)}$(NC)$_p$(Che_I)$^r_q$ vacancy;
wherein CN identifies a cyano group; and
wherein NC identifies an isocyano group.

An embodiment of the present invention may include two chelation species (Che_I and Che_II).—for example Che_I is present during a synthesis, so it can be more easily substituted into the hexacyano complexes in quantity q. Che_II, on the other hand, may only be present after the synthesis during a washing step. The specification evidences that Che_II may displace some Che_1 on the surface of the particles (quantity w of Che_I replaced by quantity v of Che_II). It is not believed that it is likely that Che_II could partially or fully displace Che_I in the complexes in quantity q.

An embodiment may include different related products represented by A$_x$Mn$_{(y-k)}$M$^j_k$[Mn$^m$(CN)$_{(6-p-q)}$(NC)$_p$(Che_I)$^r_q$]$_z$. CHE_GROUP (Vac)$_{(1-z)}$·nH$_2$O wherein the Che_I species is the "in-structure" chelation species present during synthesis and the CHE_GROUP represents one or more chelation species on a surface and may include Che_I and/or Che_II.

An embodiment of the present invention may include a method, product, composition allowing for multiple chelation species in Formula_II, including: a) synthesis with Che_I; b) isolation to remove product from synthesis solution; c) washing the isolated product from b) with a solution containing no chelating agents (removes any excess Che_I) which produces a product 1 wherein CHE_GROUP includes only Che_I; d) washing this product 1 with a solution containing Che_II which results in CHE_GROUP at this stage including some or all of Che_II; and e) a final isolation (e.g., filtration) to remove excess Che_II solution, resulting in a product 2 different from product 1 in that CHE_GROUP has Che_II replacing some or all of Che_I on the surface. A variation of this may include a step f) after step a) to add Che_II to the synthesis solution and then followed by a step g) to isolate/wash with a solution containing no chelating agents (similar to step c) which results, broadly, in product 2 with some or all surface Che_I replaced by Che_II. In this regard, formula II is a generalized representation of formula I that allows for introduction of a second different chelation species into the formation process after synthesis using a first chelation species. Without post-synthesis introduction of Che_II, formula II identifies the same resulting product as formula I.

EXPERIMENTAL SECTION

Example 1

(Product 1a)—To a stirred solution of manganese chloride tetrahydrate (23.75 g, 120.0 mmoles) in deaerated water (120 g), a solution of sodium cyanide (19.2 g, 392.0 mmoles) in deaerated water (90 g) was rapidly added over 1.0 min. under inert atmosphere of nitrogen (oxygen<0.1 ppm). The resulting mixture was stirred for an additional hour and then filtered over a 0.45 micron filter. The resulting blue powder was washed with deaerated water (50 ml), rinsed with deaerated methanol (200 ml) and dried under vacuum to give 19.7 g of a blue powder.

Example 2

(Product 2a)—To a stirred solution of manganese sulfate monohydrate (20.28 g, 120.0 mmoles) in deaerated water (120 g), a solution of sodium cyanide (19.2 g, 392.0 mmoles) in deaerated water (100 g) was rapidly added over 1.0 min. under inert atmosphere of nitrogen (oxygen<0.1 ppm). The resulting mixture was stirred for an additional hour and then filtered over a 0.45 micron filter. The resulting blue powder was washed with deaerated water (50 ml), rinsed with deaerated methanol (200 ml) and dried under vacuum to give 20.0 g of a blue powder.

Example 3

(Product 3a)—To a stirred solution of manganese acetate tetrahydrate (29.4 g, 120.0 mmoles) in deaerated water (120 g), a solution of sodium cyanide (19.2 g, 392.0 mmoles) in deaerated water (100 g) was rapidly added over 1.0 min. under inert atmosphere of nitrogen (oxygen<0.1 ppm). The resulting mixture was stirred for an additional hour and then filtered over a 0.45 micron filter. The resulting blue powder was washed with deaerated methanol (250 ml) and dried under vacuum to give 20.0 g of a blue powder.

Example 4

Surface functionalization of particles: (Product 4a)—To a stirred solution of manganese acetate tetrahydrate (29.4 g, 120.0 mmoles) in deaerated water (120 g), a solution of sodium cyanide (19.2 g, 392.0 mmoles) in deaerated water (100 g) was rapidly added over 1.0 min. under inert atmosphere of nitrogen (oxygen<0.1 ppm). The resulting mixture was stirred for an additional hour and then filtered over a 0.45 micron filter. The resulting blue powder was washed with deaerated methanol (50 ml) then with a solution of oxalic acid in deaerated methanol (20 wt/wt %, 100 ml) followed by deaerated methanol (150 ml). The resulting powder was dried under vacuum to give 20.0 g of a grey-blue powder.

Example 5

Surface functionalization of particles: (Product 5a)—To a stirred solution of manganese acetate tetrahydrate (14.7 g, 60.0 mmoles) in deaerated water (60 g), a solution of sodium cyanide (9.6 g, 196.0 mmoles) in deaerated water (50 g) was rapidly added over 1.0 min. under inert atmosphere of nitrogen (oxygen<0.1 ppm). The resulting mixture was stirred for an additional hour and then filtered over a 0.45 micron filter. The resulting blue powder was washed with deaerated methanol (50 ml) then with a solution of citric acid in deaerated methanol (2.5 wt/wt %, 100 ml) followed by deaerated methanol (150 ml). The resulting powder was dried under vacuum to give 9.8 g of a grey-blue powder.

Example 6

Surface functionalization of particles: (Product 6a)—To a stirred solution of manganese acetate tetrahydrate (14.7 g, 60.0 mmoles) in deaerated water (60 g), a solution of sodium cyanide (9.6 g, 196.0 mmoles) in deaerated water (50 g) was rapidly added over 1.0 min. under inert atmosphere of nitrogen (oxygen<0.1 ppm). The resulting mixture was stirred for an additional hour and then filtered over a 0.45 micron filter. The resulting blue powder was washed with deaerated methanol (50 ml) then with a solution of tartaric acid in deaerated methanol (2.5 wt/wt %, 100 ml) followed by deaerated methanol (150 ml). The resulting powder was dried under vacuum to give 9.9 g of a grey-blue powder.

Example 7

Surface functionalization of particles: (Product 7a)—To a stirred solution of manganese acetate tetrahydrate (14.7 g, 60.0 mmoles) in deaerated water (60 g), a solution of sodium cyanide (9.6 g, 196.0 mmoles) in deaerated water (50 g) was rapidly added over 1.0 min. under inert atmosphere of nitrogen (oxygen<0.1 ppm). The resulting mixture was stirred for an additional hour and then filtered over a 0.45 micron filter. The resulting blue powder was washed with deaerated methanol (50 ml) then with a solution of glycolic acid in deaerated methanol (2.5 wt/wt %, 100 ml) followed by deaerated methanol (150 ml). The resulting powder was dried under vacuum to give 9.8 g of a grey-blue powder.

Example 8

Surface functionalization of particles: (Product 8a)—To a stirred solution of manganese acetate tetrahydrate (14.7 g, 60.0 mmoles) in deaerated water (60 g), a solution of sodium cyanide (9.6 g, 196.0 mmoles) in deaerated water (50 g) was rapidly added over 1.0 min. under inert atmosphere of nitrogen (oxygen<0.1 ppm). The resulting mixture was stirred for an additional hour and then filtered over a 0.45 micron filter. The resulting blue powder was washed with deaerated methanol (50 ml) then with a solution of succinic acid in deaerated methanol (2.5 wt/wt %, 100 ml) followed by deaerated methanol (150 ml). The resulting powder was dried under vacuum to give 10.0 g of a grey-blue powder.

Example 9

Surface functionalization of particles: (Product 9a)—To a stirred solution of manganese acetate tetrahydrate (14.7 g, 60.0 mmoles) in deaerated water (60 g), a solution of sodium cyanide (9.6 g, 196.0 mmoles) in deaerated water (50 g) was rapidly added over 1.0 min. under inert atmosphere of nitrogen (oxygen<0.1 ppm). The resulting mixture was stirred for an additional hour and then filtered over a 0.45 micron filter. The resulting blue powder was washed with deaerated methanol (50 ml) then with a solution of malic acid in deaerated methanol (2.5 wt/wt %, 100 ml) followed by deaerated methanol (150 ml). The resulting powder was dried under vacuum to give 9.8 g of a grey-blue powder.

Example 10

Surface functionalization of particles: (Product 10a)—To a stirred solution of manganese acetate tetrahydrate (14.7 g, 60.0 mmoles) in deaerated water (60 g), a solution of sodium cyanide (9.6 g, 196.0 mmoles) in deaerated water (50 g) was rapidly added over 1.0 min. under inert atmosphere of nitrogen (oxygen<0.1 ppm). The resulting mixture was stirred for an additional hour and then filtered over a 0.45 micron filter. The resulting blue powder was washed with deaerated methanol (50 ml) then with a solution of lactic acid (88%) in deaerated methanol (2.5 wt/wt %, 100 ml) followed by deaerated methanol (150 ml). The resulting powder was dried under vacuum to give 9.7 g of a grey-blue powder.

Example 11

Surface functionalization of particles: (Product 11a)—To a stirred solution of manganese acetate tetrahydrate (29.4 g, 120.0 mmoles) in deaerated water (120 g), a solution of sodium cyanide (19.2 g, 392.0 mmoles) in deaerated water (100 g) was rapidly added over 1.0 min. under inert atmosphere of nitrogen (oxygen<0.1 ppm). The resulting mixture was stirred for an additional hour and then filtered over a 0.45 micron filter. The resulting blue powder was washed with a solution of acetic acid in deaerated methanol (30 V/V %, 50 ml) followed by deaerated methanol (150 ml). The resulting powder was dried under vacuum to give 20.0 g of a blue powder.

Example 12

Surface functionalization of particles: (Product 12a)—To a stirred solution of manganese acetate tetrahydrate (29.4 g, 120.0 mmoles) in deaerated water (120 g), a solution of sodium cyanide (19.2 g, 392.0 mmoles) in deaerated water (100 g) was rapidly added over 1.0 min. under inert atmosphere of nitrogen (oxygen<0.1 ppm). The resulting mixture was stirred for an additional hour and then filtered over a 0.45 micron filter. The resulting blue powder was washed with deaerated methanol (50 ml) then with a solution of HEDP (hydroxyethane dimethylene phosphonic acid) in deaerated methanol (5.0 wt/wt %, 50 ml) followed by deaerated methanol (150 ml). The resulting powder was dried under vacuum to give 20.0 g of a blue powder.

Example 13

Surface functionalization of particles: (Product 13a)—To a stirred solution of manganese acetate tetrahydrate (14.7 g, 60.0 mmoles) in deaerated water (60 g), a solution of sodium cyanide (9.6 g, 196.0 mmoles) in deaerated water (50 g) was rapidly added over 1.0 min. under inert atmosphere of nitrogen (oxygen<0.1 ppm). The resulting mixture was stirred for an hour and then sodium glycinate (1.0 g) was added in powder and the mixture was stirred for an additional 10 min. The mixture was then filtered over a 0.45 micron filter. The resulting blue powder was washed with deaerated methanol (150 ml) and then dried under vacuum to give 9.8 g of a grey-blue powder.

Example 14

Surface functionalization of particles: (Product 14a)—To a stirred solution of manganese acetate tetrahydrate (29.4 g, 120.0 mmoles) in deaerated water (120 g), a solution of sodium cyanide (19.2 g, 392.0 mmoles) in deaerated water (100 g) was rapidly added over 1.0 min. under inert atmosphere of nitrogen (oxygen<0.1 ppm). The resulting mixture was stirred for an additional hour and then EDTA (ethylene diamine tetra-acetic acid) tetrasodium salt (2.0 g) was added in powder and the mixture was stirred for an additional 10 min. The mixture was then filtered over a 0.45 micron filter. The resulting blue powder was washed with deaerated methanol (250 ml) and then dried under vacuum to give 20.0 g of a blue powder.

Example 15

Surface functionalization of particles: (Product 15a)—To a stirred solution of manganese acetate tetrahydrate (14.7 g, 60.0 mmoles) in deaerated water (60 g), a solution of sodium cyanide (9.6 g, 196.0 mmoles) in deaerated water (50 g) was rapidly added over 1.0 min. under inert atmosphere of nitrogen (oxygen<0.1 ppm). The resulting mixture was stirred for an hour and then sodium oxalate (4.0 g) was added in powder and the mixture was stirred for an additional 10 min. The mixture was then filtered over a 0.45 micron filter. The resulting blue powder was washed with deaerated methanol (150 ml) and then dried under vacuum to give 10.0 g of a grey-blue powder.

New TMCCC Species

Disclosed herein is a genus for certain TMCCC materials. A particular species of this genus is described having a new, surprising, and unexpected result. The earlier discussed compositions of matter for TMCCC anode materials are described as undergoing a single reaction and operation over a wider electrochemical potential range than associated with this new species of TMCCC materials.

An embodiment of the present invention may include a composition corresponding to Formula III below:

$$A_xMn_y[Mn(CN)_{(6)}]_z(Vac)_{(1-z)}n(H_2O)m(Che) \quad \text{(Formula III)}$$

wherein, in Formula III, A includes one or more alkali metals including Na; and wherein $0<j\leq4$, $0\leq k\leq0.1$, $1.2<x\leq4$, $0<y\leq1$, $0.8<z\leq1$, $0<n\leq4$; $0\leq m\leq0.2$ and wherein $x+2y-4z=0$; and wherein said anode includes a concentration of A metals, said concentration of A metals including a first concentration of A metals x1, $x1\geq1.2$; wherein Formula III includes one or more $Mn(CN)_6$ complexes each including an Mn atom; and wherein m is an average valence of said Mn atoms found in said one or more $Mn(CN)_6$ complexes; and wherein (Vac) identifies a $Mn(CN)_6$ vacancy, and wherein each particular $Mn(CN)_6$ complex includes said Mn atom bonded to a plurality of cyanide groups; and wherein (Che) identifies a chelating group.

A higher wider electrochemical potential range for an electrode results in a wider operating voltage range for an electrochemical cell. This wider operating voltage range may increase the cost and complexity of the power electronics used to operate one or more of these electrochemical cells.

This new species embodies a new class of TMCCC materials that undergo multiple electrochemical reactions in a narrow potential range, and therefore, allows the electrochemical cell to operate in a narrower voltage range and with a greater precision in measurement of state-of-charge.

Embodiments of this species describe not only may include a new TMCCC material, it may also include a novel electrochemical behavior in TMCCC anode materials that is advantageous to cell performance. The as-synthesized composition of matter and crystal structure of these species materials disclosed here may be included in the genus, both the species composition and the crystal structure achieved during electrochemical cycling is believed novel and proceeds by a reaction mechanism that has never been previously described, taught, or suggested.

This species is a new hexacyanomanganate-based transition metal cyanide coordination compound (TMCCC) material. The species material claimed here is unique, at least in part, because it undergoes unique electrochemical cycling via a novel reaction process. This species includes synthesis methods, compositions, and structures of such new TMCCC materials. The methods are closely related to the methods disclosed herein with respect to the genus and other species. The as-synthesized composition and crystal structure fall within ranges described by the prior art. However, during electrochemical cycling of this new material, a novel composition and crystal structure are reached. To reach that novel composition and structure, the electrochemical cycling of this material must proceed by a novel mechanism involving unique changes to the crystal structure.

This species relates to specific compositions and structures of a sodium manganese hexacyanomanganate (MnHCMn) TMCCC anode material. As synthesized, these materials have the general chemical formula $Na_xMn^{II}_y[Mn^{II}(CN)_{6-p}(NC)_p]_z(H_2O)_n$ where $x+2y-4z=0$ to fulfill charge neutrality. For purposes of the following discussion, it is assumed that for this TMCCC species, as synthesized, all of the manganese present in the material is in a 2+ state, although this is not generally true for other types of hexacyanomanganate-based TMCCC materials. This chemical formula is most commonly normalized to y=1. In that case, a typical as-synthesized composition includes $0\leq x\leq2$, $0.5\leq z\leq1$, and $0\leq n\leq4$. The stoichiometry of a MnHCMn material depends on the conditions under which it is synthesized, including the concentration of the reactant species, temperature, rate of reaction, and other parameters.

TMCCC materials have a general chemical formula of $A_xP_y[R(CN)_{6-p}(NC)_p]_z(H_2O)_n$ where A is a mobile alkali or divalent cation such as $Na^+$, $K^+$, $Mg^{2+}$, and P and R are transition metal cations having a valence of $1^+$, $2^+$, $3^+$, or $4^+$. For example, the P site manganese present in a hexacyanomanganate anode may be substituted with other dopant metals M in a composition $Na_xMn^{II}_{y-k}M^j_k[Mn^{II}(CN)_{6-p}(NC)_p]_z(H_2O)_n$, where k is a quantity of the M dopant and where each one or more M dopant may optionally be at least one independently selected alkaline earth metal Mg or Ca, post-transition metal Al, Ga, In, Sn, or Pb, or transition metal Sc, Ti, V, Cr, Fe, Co, Ni, Cu, Zn, Pd, Ag, or Cd having an average valence j.

TMCCC materials may further be reacted with other compounds such as a chelating agent, which may be incorporated into the crystal structure of the TMCCC, or that may bind to and functionalize the surface of the TMCCC. The reaction of a TMCCC material with a chelating agent may result in a compound including a composition corresponding to $A_xP_y[R(CN)_{6-p-q}(NC)_p(Che)_q]_z(H_2O)_n(Che)_w$ where Che denotes one or more chelating agent species. In a typical TMCCC/chelate compound, w is less than about 0.2 and the sum of p and q is less than 6. These reactions may be performed by washing a TMCCC material with a solution in which the chelating agent has been dissolved in water or an organic solvent such as methanol or another alcohol. These chelating agents may include carboxylates or carboxylic acids such as oxalic acid, glyoxylic acid, and citric acid, or they may include amines or acids of amines such as ethylenediaminetetraacetic acid. The presence of one or more chelating agents may be advantageous to improving the chemical or electrochemical stability of the TMCCC material. In the case that q=0 and the composition of the electrochemically active hexacyanometallate groups are unchanged by a reaction of the TMCCC with the chelating agent, the electrochemical properties of the TMCCC may be unchanged by this reaction.

TMCCC materials have an open framework crystal structure in which the transition metal cations form a framework structure in which adjacent transition metals are linked by cyanide bridging ligands in three dimensions. In this structure, octahedral $P(CN)_{6-p}(NC)_p$ groups are coordinated to six adjacent P transition metal cations. The framework structure contains large interstitial A sites that are linked together by three-dimensional channels. The $A^+$ cations occupy interstitial A sites inside the framework structure. These A sites may also contain interstitial water. The TMCCC structure is most commonly cubic, in which case the hexacyanometallate $P(CN)_{6-p}(NC)_p$ groups are regular octahedra and the bridging CN ligands between the P and R site transition metals are all linearly aligned. The TMCCC structure is also known to form other phases such as monoclinic or rhombohedral phases in which the hexacyanometallate groups are distorted and the CN ligands are not linearly aligned with the adjacent P and R site transition metals. In some cases, these distortions may be related to the quantity of interstitial cations or water present in the structure.

In the simplest case of a cubic TMCCC structure, each unit cell of the structure contains four formula units of $A_xP_y[R(CN)_{6-p}(NC)_p]_z(H_2O)_n$, and there are eight interstitial A sites, each of which is at the center of one of the octants of the cubic unit cell at the ¼, ¼, ¼-type positions. During electrochemical cycling of a TMCCC material, the $A^+$ cations will move from one A site to the next through channels pointing along a primary axes of the unit cell. Thus, an $A^+$ cation in the center of a channel and halfway between two A sites would occupy a position such as ¼, ¼, 0, ¼, ¼, ½, and the like.

In the case of a MnHCMn material in which x=2, y=1, and z=1, there are no vacancies in the crystal structure of the material. Under this condition, all of the P and R sites in the framework structure are fully occupied, and there is one $Na^+$ cation in every interstitial site. In other words, at an A site occupancy of 1.0 there are 2 $Na^+$ cations present for each formula unit of the framework. However, in the case that z<1, then to fulfill charge neutrality, x<2. More specifically, as each $Mn^{II}(CN)_{6-p}(NC)_p$ group has a total charge of −4, a decrease in z by Δz results in a decrease of x of Δx=4Δz. For example, for z=0.9, charge neutrality is fulfilled by x=1.6. In this case, the A site occupancy of 0.8 fulfills charge neutrality. Similarly, for z=0.8, charge neutrality is fulfilled by x=1.2 and A site occupancy of 0.6.

MnHCMn materials may be used as the negative electrode (an anode) in an electrochemical cell. During the charging of an anode, additional electrons and mobile cations (in this case, alkali cations such as $Na^+$) are inserted into the material. Thus, during electrochemical charging of a MnHCMn anode, a hexacyanomanganate group $Mn^{II}(CN)_{6-p}(NC)_p$ undergoes reduction to $Mn^{I}(CN)_{6-p}(NC)_p$ by accepting an electron, and a Na cation is inserted into an A site in the framework structure to maintain charge neutrality.

Therefore, when a MnHCMn anode is charged, a composition in which x>2 may be achieved. For this to occur, the anode must be charged to the point that any initially vacant A sites are filled (thereby reaching x=2), and then additional charging must occur. This is not possible for all compositions of MnHCMn anodes. For example, in the case of a material having an initial composition of $Na_{1.2}Mn^{II}[Mn^{II}(CN)_6]_{0.8}(H_2O)n$ electrochemical reduction of all of the hexacyanomanganate groups results in a fully charged composition of $Na_2Mn^{II}[Mn^{I}(CN)_6]_{0.8}(H_2O)_n$. In this case, at a full state of charge, each A site contains one $Na^+$ cation. If charging of this material were less than perfectly efficient, then x<2 and the A site occupancy would be less than one.

In contrast, a MnHCMn anode having an initial concentration including z>0.8 and x>1.2 may undergo electrochemical charging to reach a charged composition including x>2. For example, a material having an initial composition of $Na_{1.6}Mn^{II}[Mn^{II}(CN)_6]_{0.9}(H_2O)_n$ may be electrochemically reduced to reach a fully charged composition of $Na_{2.5}Mn^{II}[Mn^{I}(CN)_6]_{0.9}(H_2O)_n$. In this case, x=2.5 corresponds to an A-site occupancy of 1.25.

Particles having the same polarity of electric charge repel one another. Inserting two $Na^+$ cations into a single interstitial A site will therefore result in electrostatic repulsion such that neither of the two cations occupies the center of the site. Instead, the two $Na^+$ cations will occupy positions on opposite sides of the center of the A site, such as in the centers of the channels leading from that A site to the adjacent ones. For example, in the case of an A site centered at the position ¼, ¼, ¼ of the unit cell, a local site occupancy of 2 (equivalent to x=4) may be achieved when four $Na^+$ cations occupy the centers of four channels adjacent to that site, at the positions 0, ¼, ¼, ¼, 0, ¼, ½, ¼, ¼, and ¼, ½, ¼. In this configuration, adjacent $Na^+$ cations are approximately the same distance apart as the centers of two adjacent A sites. They therefore feel the same charge repulsion from one another as would two $Na^+$ cations located at the center of two adjacent A sites in the case of x≤2.0.

The potential at which an electrochemical reaction occurs is proportional to the Gibbs free energy of the reaction: $\Delta G=-nFV$, where $\Delta G$ is a change in Gibbs free energy, n is a change in charge during the reaction, F is Faraday's constant, and V is the potential. A more negative free energy of reaction therefore corresponds to a higher potential. Since the anode is the negative electrode in a cell, a higher cell voltage is achieved when the anode potential is lower, or equivalently, when the Gibbs free energy of the reaction is less negative. The electrostatic potential energy of two charged particles is proportional to the charges of the two particles and inversely proportional to the distance between them. In the case that the two particles have the same charge, then their electrostatic potential energy is positive. The smaller the distance between those two particles, the more highly positive their electrostatic potential energy will be.

Therefore, the reaction potential of a MnHCMn anode will be lower when a greater charge repulsion is present between the Na$^+$ cations inserted during charging, or equivalently, for a greater x. To maximize the voltage of a cell containing a MnHCMn anode, an anode having an initial composition as close as possible to x=2 should be used. As discussed above, in the case of a MnHCMn anode having a low initial Na$^+$ content, such as Na$_{1.2}$Mn$^{II}$[Mn$^{II}$(CN)$_6$]$_{0.8}$(H$_2$O)$_n$, charging will proceed by the mechanism of increasing the fraction of A sites occupied by one Na$^+$ cation until all of the hexacyanomanganate groups are reduced and a fully charged composition of Na$_2$Mn$^{II}$[Mn$^{I}$(CN)$_6$]$_{0.8}$(H$_2$O)$_n$ is reached. In this case, the average distance between Na$^+$ cations is initially greater than the distance between adjacent A sites since not all A sites are occupied. The relatively low charge repulsion between adjacent Na$^+$ cations results in a reaction potential that is initially high and that varies over a wide potential range as electrochemical cycling proceeds.

In contrast, in the case of a MnHCMn anode having a high initial Na$^+$ content, such as Na$_{1.6}$Mn$^{II}$[Mn$^{II}$(CN)$_6$]$_{0.9}$(H$_2$O)$_n$, charging will proceed at first by increasing the fraction of A sites occupied by one Na$^+$ cation until each of them is full. Additional charging to a composition including x>2 and an average A site occupancy>1.0 must proceed by a second mechanism in which the Na$^+$ cations occupy locations on opposite sides of the A sites. For the high Na$^+$ material Na$_{1.6}$Mn$^{II}$[Mn$^{II}$(CN)$_6$]$_{0.9}$(H$_2$O)$_n$ to reach a fully charged composition of Na$_{2.5}$Mn$^{II}$[Mn$^{I}$(CN)$_6$]$_{0.9}$(H$_2$O)$_n$, 0.4 formula units of Na$^+$ are inserted during a first reaction in which the A sites each fill with one Na$^+$ cation, and then 0.5 formula units of Na$^+$ are inserted during a second reaction in which Na$^+$ cations occupy locations on opposite sides of each A site. Those locations may include the channel-centers midway between adjacent A sites. As the second reaction proceeds, the occupancy of Na$^+$ cations at those channel centers increases. But as there are twice as many channel centers as A sites in the structure, the occupancy of the channel centers never exceeds one. More specifically, for a defect free MnHCMn anode having an initial composition including a first x=2, full charging of all of the hexacyanomanganate groups will result in a second x=3, and a channel-center occupancy of 0.75.

The materials described in this invention undergo electrochemical cycling by both of these two reaction mechanisms. The two reactions occur at different potentials because they have different energetics deriving from effects including but not limited to charge repulsion, as discussed above. During charging and discharging of an electrode, the potential of the electrode (V) may be measured as a function of the charge state (Q), resulting in a potential profile function V(Q). One method for defining electrochemical reaction is by observing a peak when a differential coulometry analysis is performed on the potential profile function by plotting dQ/dV(Q) as a function of Q to produce a differential coulometry spectrum. This analysis has been performed for TMCCC cathodes in Reference [1] and for common lithium-ion electrodes in Reference [2].

Each electrode material includes a unique potential profile function V(Q) and differential coulometry spectrum dQ/dV(Q). A comparison of dQ/dV(Q) spectra during successive charge-discharge cycles of the cell may provide information about the state of health of the cell. The state of health of a cell may include factors such as the relative states of charge of the two electrodes in the cell. For instance, in a "healthy" cell, each of the two electrodes may have a 50% state of charge when the cell is at a 50% state of charge on a basis of its capacity. On the other hand, an "unhealthy" cell may contain electrodes that have imbalanced states of charge, such as one electrode having a state of charge of greater than 50%, and the second having a state of charge of less than 50% when the cell is at a 50% state of charge on a basis of its capacity. Measuring the state of charge balance of a cell may be advantageous because an imbalance may correlate with future failure of the cell. Thus, an "unhealthy" cell may include an imbalance in the states of charge of its electrodes.

It may be advantageous to the measurement of state of health of a cell to include an electrode material that has a dQ/dV(Q) spectrum that includes two or more peaks. In the case that a cell includes two electrodes that each have only dQ/dV(Q) one peak, these peaks may overlap, leading to a full cell dQ/dV(Q) spectrum having only one peak. When the states of charge of the two electrodes in such a cell were to slip such that their dQ/dV(Q) peaks occurred at different states of charge of the full cell, then the full cell dQ/dV(Q) spectrum would contain two peaks. However, it may not be possible to deduce which of the two electrodes slipped a higher-than-desired state of charge, and which of the electrodes slipped to a lower-than-desired state of charge. In contrast, as described in Reference [2], in the case that at least one of the two electrodes in a cell includes a material having two peaks in its dQ/dV(Q) spectrum, then a change in the position and number of peaks in the dQ/dV(Q) spectrum of the cell may be assigned to a unique slip in the states of charge of the two electrodes.

An understanding of the state of health of a cell including its dQ/dV(Q) spectrum and the states of charge of the electrodes it contains may be useful for extending the service life of a product containing one or more battery cells. For example, analysis of changes to the peaks present in the dQ/dV(Q) spectrum can be used to determine changes in the operating state of charge ranges of each of the two electrodes in the cell. In the case that a degradation mechanism that limits cell service life occurs at a particular state of charge for one of the electrodes in the cell, then with knowledge of the state of charge ranges of the two electrodes as determined by dQ/dV(Q) analysis the operating voltage and state of charge range of the full cell may be curtailed to extend the service life of the cell. More generally, this may be performed for a battery pack containing a string of multiple cells in series, where a battery management system may limit the state of charge range of individual cells to extend their service lives, and therefore, the service life of the entire battery pack.

The materials described in this species undergo either one or two reactions during the cycling of the hexacyanomanganate groups from a discharged Mn$^{II}$(CN)$_{6-p}$(NC)$_p$ state to a Mn$^{I}$(CN)$_{6-p}$(NC)$_p$ charged state. TMCCC electrodes are known to undergo multiple electrochemical reactions when multiple P and R site species are oxidized or reduced, as described in Reference [1]. They are also known to undergo multiple electrochemical reactions when the same P or R site species undergoes multiple changes in valence, as shown for hexacyanomanganate-based TMCCCs in Reference [3] that proceed from Mn$^{III}$(CN)$_6$ to Mn$^{II}$(CN)$_6$ in a first reaction, and then to Mn$^{I}$(CN)$_6$ in a second reaction. However, the materials described in this species are unique, at least in part, because they undergo two reactions during a single change in valence of a hexacyanomanganate group from Mn$^{II}$(CN)$_{6-p}$(NC)$_p$ to Mn$^{I}$(CN)$_{6-p}$(NC)$_p$.

Further evidence for the two-reaction electrochemical cycling of the materials described in this invention is found in their X-ray diffraction spectra. Previously reported MnHCMn anode materials have no change in crystal structure during charging from a $Mn^{II}(CN)_6$ state to a $Mn^I(CN)_6$ state (Reference [3]), or they may undergo one phase change for each of the two reactions from a $Mn^{III}(CN)_6$ state to a $Mn^{II}(CN)_6$ state and from a $Mn^{II}(CN)_6$ state to a $Mn^I(CN)_6$ state (Reference [4]).

The materials reported in this species are unique, at least in part, because they undergo electrochemical reactions and two changes in structure during electrochemical cycling of a single change in valence of the hexacyanomanganate group from a $Mn^{II}(CN)_6$ state to a $Mn^I(CN)_6$ state.

A first phase change from a monoclinic structure to a cubic structure is observed as charging begins, and as x increases from its initial value to a second value of approximately 2.0. This is evidenced by a convergence of peaks in the X-ray diffraction spectra at low state of charge. For example, the (21-1) and (020) peak at 23.3° and the (211) and (002) peak at 24.0° that are present for a fully discharged material converge to form a new peak at 23.5°, which is for the (220) plane a cubic phase. When this first reaction is complete, only this third peak remains.

A second phase change from a cubic structure to a tetragonal structure is observed as charging continues, and as x increases beyond 2.0 to relatively high values of 2.5 or more. This is evidenced by a splitting of the h00 peaks of the cubic phase, such as the splitting of the 400 peak into two peaks at approximately 34°. A tetragonal phase is consistent with a uniaxial strain associated with planar ordering of $Na^+$ cations at the channel-center positions.

Some of the materials described in this species include an initial composition including a high initial $Na^+$ concentration and a low concentration of hexacyanomanganate vacancies. For instance, material an2 was synthesized to include an initial composition of $Na_{1.67}Mn[Mn(CN)_{6-p}(NC)_p]_{0.92}(H_2O)_{2.1}(OA)_w$, such that x=1.67. For material an2, 0.33 formula units of $Na^+$ must be added to the structure during the first reaction. Then, up to 0.59 formula units of $Na^+$ may be added to the material during the second reaction. A full charge of material an2 results in a maximum x≈2.59. For material an2, the first reaction proceeds at a relatively high potential of about 1.99 to 2.10 V versus $Na^+/Na$ and has a specific capacity of about 22 mAh/g. During this first reaction, material an2 undergoes a phase change from a monoclinic phase to a cubic phase. Approximately 33% of the total electrochemical capacity of material an2 is accessed at potential greater than 1.90 V, while 67% is accessed at potentials less than 1.90 V. At those lower potentials, a second electrochemical reaction occurs, as evidenced by a second peak in the differential coulometry spectrum. During that second reaction, material an2 undergoes a phase change from a cubic phase to a tetragonal phase. During this second reaction, material an2 may be cycled between approximately 33% state of charge and approximately 98% state of charge in a narrow potential range of 0.2 V between 1.70 and 1.90 V. The ability to access a majority of an anode's capacity at a low potential and in a narrow voltage range is desirable because it increases the cell voltage and enables the cell to be operated in a narrower voltage range.

In contrast, conventional MnHCMn anode materials that include a low initial $Na^+$ concentration and a high concentration of hexacyanomanganate vacancies. For example, material an3 undergoes a single electrochemical reaction during the reduction of its constituent $Mn^{II}(CN)_{6-p}(NC)_p$ groups to $Mn^I(CN)_{6-p}(NC)_p$. The differential coulombetry spectrum shows a single peak in charge and discharge, indicating that just one reaction occurs. During charging of material an3, the $Na^+$ concentration increases from its initial value of 1.24 to a maximum value of 2.05. No phase change is observed during this reaction, and a cubic crystal structure is maintained at all states of charge. Throughout this charging process, the occupancy of the A sites is less than or approximately equal to 1. Therefore, the average distance between $Na^+$ cations in the structure continuously decreases as material an3 is charged. This increasing charge repulsion contributes to a relatively high reaction potential: 90% of the total capacity of the material is accessed above 1.90 V versus $Na^+/Na$, and only 10% of the capacity is accessed below 1.90 V. This is a significant difference from material an2, for which the vast majority of capacity was accessed below 1.90 V.

EXAMPLES

Material an2:

To a reactor at 20° C. containing 1.0 wt % of a solution of manganese acetate tetrahydrate (3594 g, 14.7 moles) in deaerated water (7335 g), a solution of sodium cyanide (2300 g, 46.9 moles) in deaerated water (7108 g) at room temperature and the remaining solution of manganese acetate tetrahydrate at room temperature was added simultaneously over 10.0 minutes under inert atmosphere of nitrogen (oxygen<0.1 ppm). The resulting mixture was stirred for an additional hour and then filtered over a 11 micron filter. The resulting blue powder was washed with a mixture of deaerated acetic acid and methanol (47 wt/wt % Acid conc, 1.32 L/1.98 L) then with deaerated methanol (15.1 L) followed by a solution of oxalic acid dihydrate in deaerated isopropynol (2.5 wt/wt %, 7.6 L). The resulting powder was dried under vacuum for 16 h at 75° C. to give 2.5 kg of a blue powder.

Material an3:

To a stirred solution of manganese acetate tetrahydrate (2008.9 g, 8.2 moles) in deaerated water (8214.4 g) at 3° C., a solution of sodium cyanide (1278.8 g, 26.1 moles) in deaerated water (6830.4 g) at room temperature was rapidly added over 1.0 minute under inert atmosphere of nitrogen (oxygen<0.1 ppm). The resulting mixture was stirred for an additional hour and then filtered over a 11 micron filter. The resulting blue powder was washed with a mixture of deaerated acetic acid and methanol (47 wt/wt % Acid conc, 1.32 L/1.98 L) then with deaerated methanol (15.1 L) followed by a solution of oxalic acid dihydrate in deaerated isopropynol (2 wt/wt %, 7.6 L). The resulting powder was dried under vacuum for 16 h at 75° C. to give 1.4 kg of a blue powder.

For each example material (i.e., material an2 and material an3), the composition of the TMCCC structure was quantitatively determined by performing a chemical analysis that included an inductively coupled plasma (ICP) technique to determine metals content, a CHN analysis to determine the cyanide content, and a thermogravimetric analysis (TGA) to determine the water content. The presence of the oxalic acid chelating agent in each of the example materials was qualitatively confirmed by performing Fourier transform infrared spectroscopy (FTIR). Scanning electron microscopy of the materials found no evidence of bulk oxalate salts, placing an upper limit on the thickness of deposited OA of approximately 10 nm, or equivalently, w=0.05.

For each example anode material (material an2 and material an3), electrodes were prepared by mixing the active material powder with carbon black and a polymer binder such as poly(vinylidene)difluoride or styrene-butadiene in a 85:7.5:7.5 mass ratio in a mixture of organic solvents such as n-methyl-pyrrolidinone, xylenes, toluene, and alcohols such as butanols. The solids fraction of the slurries were between 30% and 50%. The resulting slurries were spread onto substrates made of either carbon felt or carbon-coated aluminum foil and then dried in a vacuum oven at a maximum temperature no greater than 100° C. In some cases, the resulting dried electrodes were calendered from their initial porosities of 50-60% to a lower porosity of 15-25%. Then, the electrodes were assembled into three-electrode electrochemical cells that also contained a sealed Ag/AgCl or activated charcoal reference electrode, an activated charcoal counter electrode or sodium manganese iron hexacyanoferrate TMCCC cathode, and an anhydrous electrolyte that included acetonitrile solvent and 0.8 M sodium bis(trifluoromethane)sulfonimide salt. Electrochemical tests including galvanostatic cycling at rates of C/10 to 1 C or more were performed on these cells using a programmable battery tester.

Figure 6:
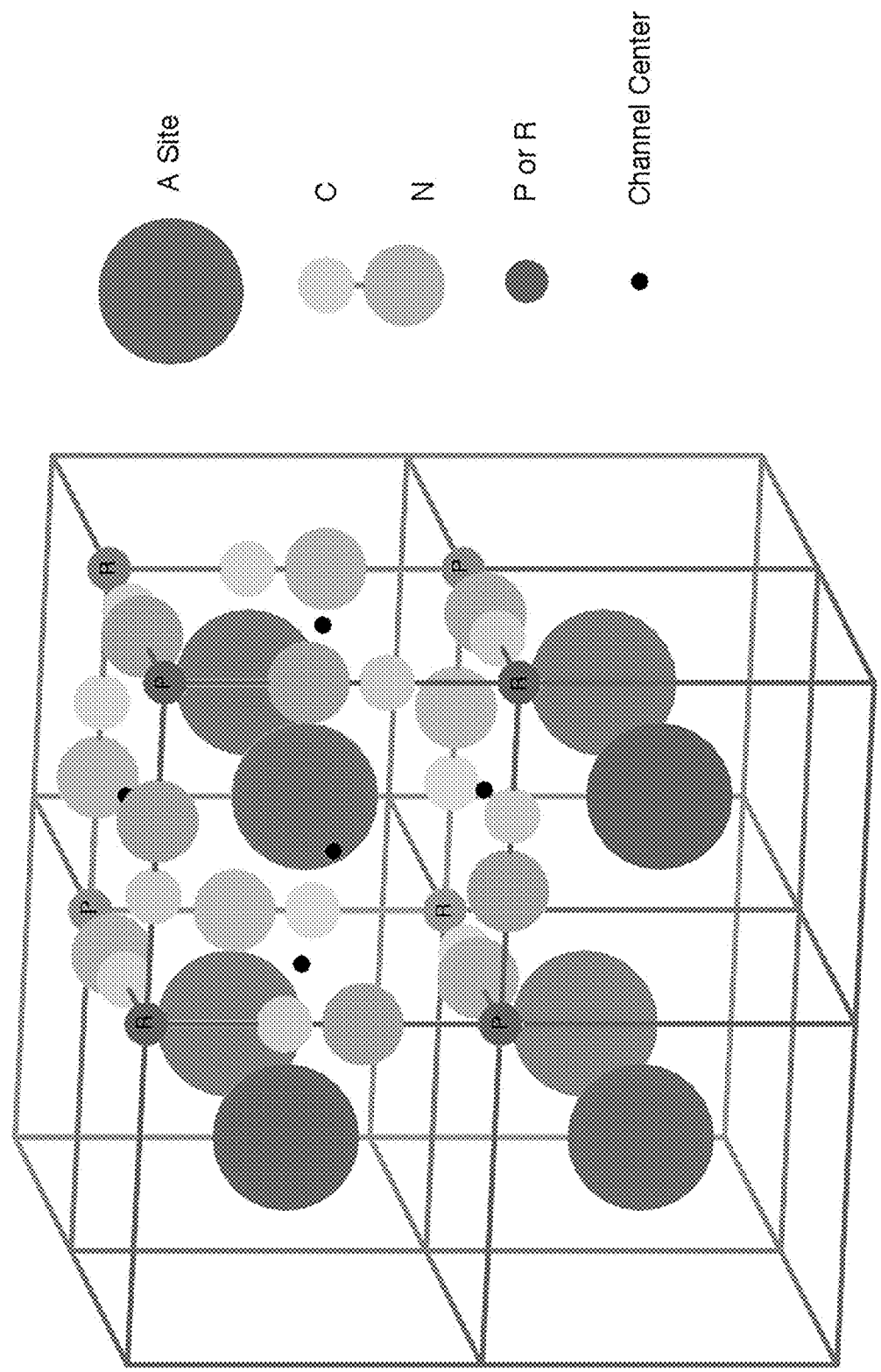
FIG. 6 illustrates a unit cell of a cubic TMCCC material, in which one octant of the framework is fully populated for clarity.

FIG. 6 illustrates a unit cell of a cubic TMCCC material, in which one octant of the framework is fully populated for clarity. Each unit cell contains four formula units of TMCCC material, eight A sites, and sixteen channel centers.

Figure 7:
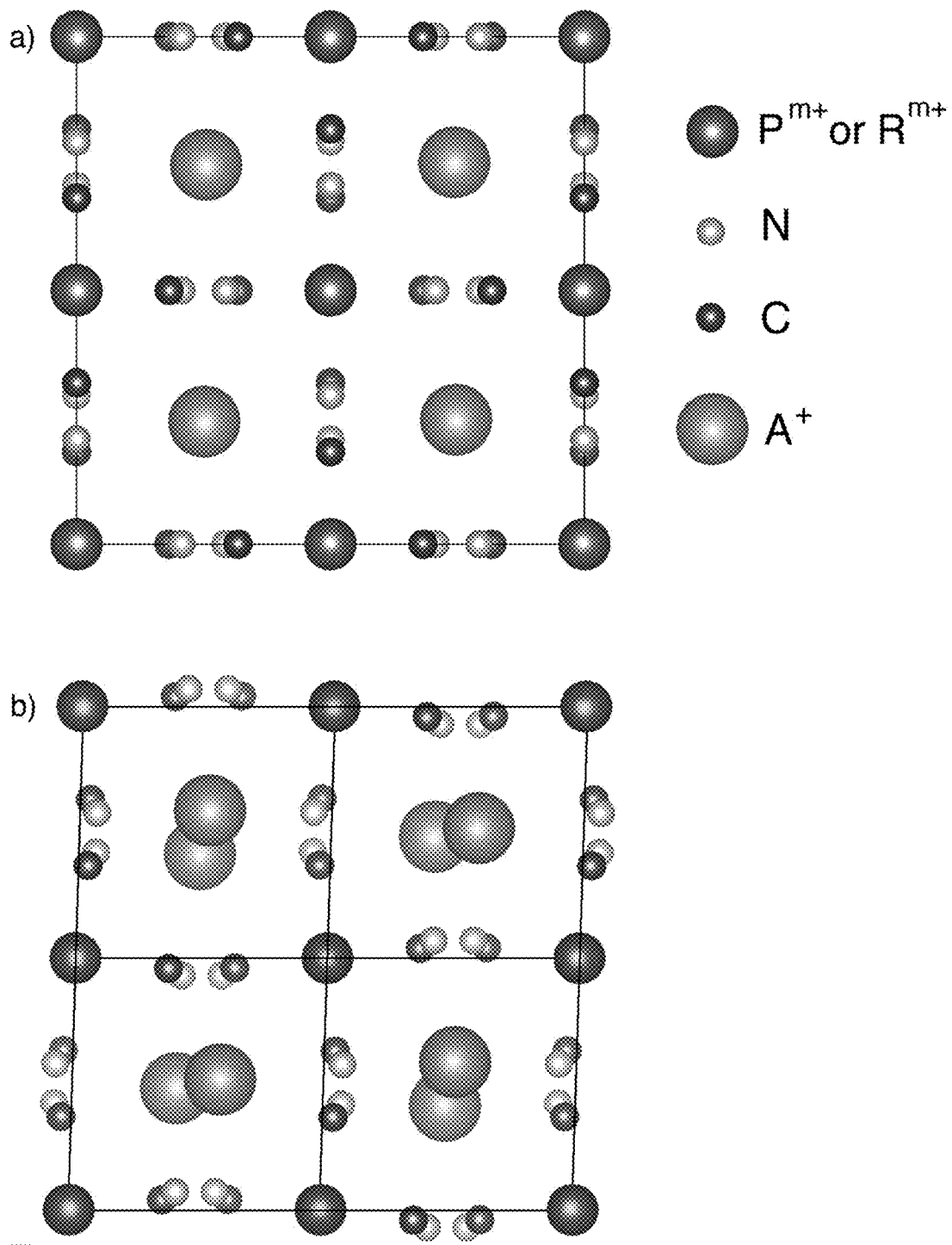
FIG. 7 illustrates crystal structures of cubic and monoclinic phases of manganese hexacyanomanganate TMCCC materials.

FIG. 7 illustrates crystal structures of cubic and monoclinic phases of manganese hexacyanomanganate TMCCC materials.

Figure 8:
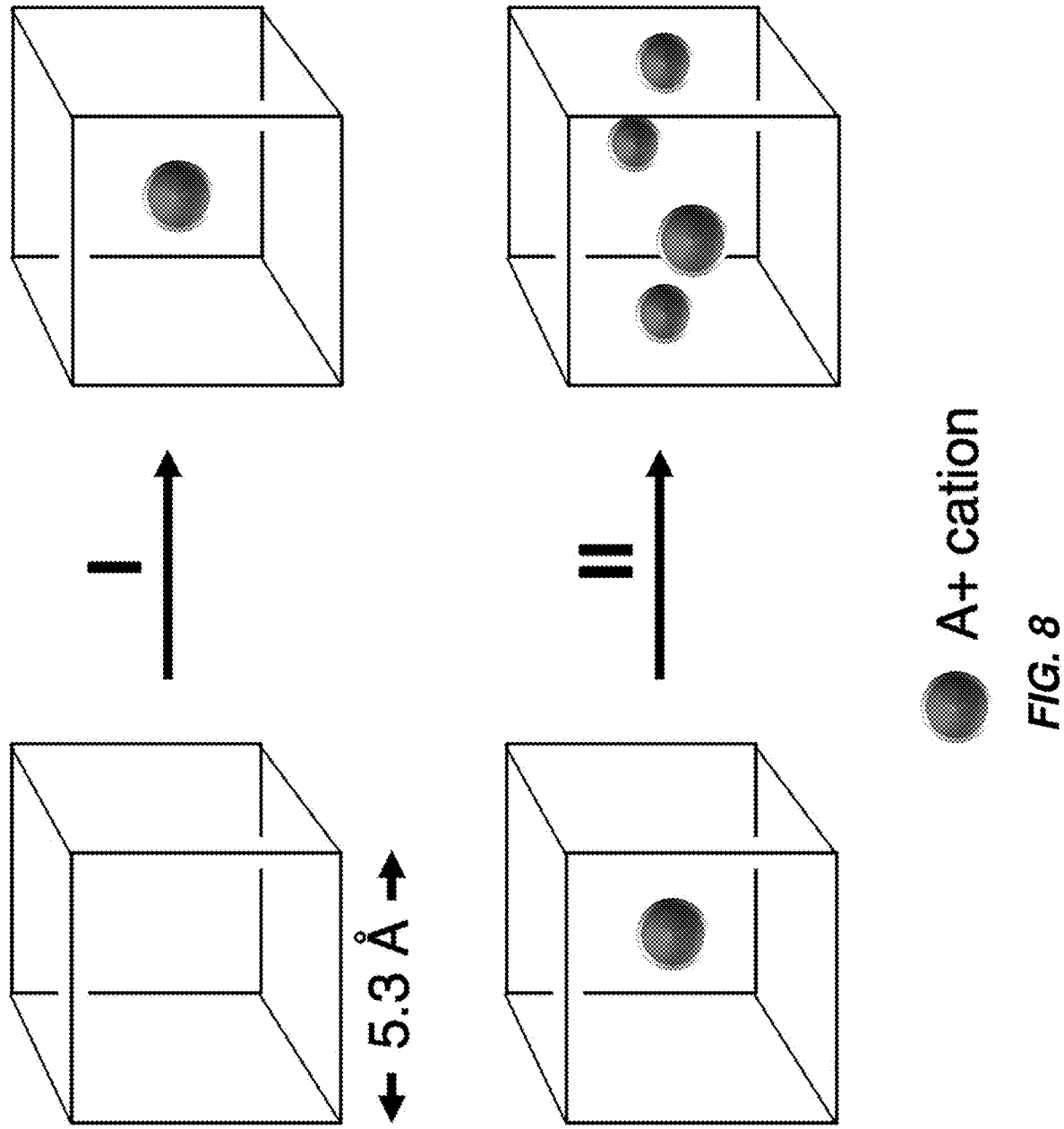
FIG. 8 illustrates schematic representations of the first and second reaction mechanisms during electrochemical cycling of hexacyanomanganate(II/I)

FIG. 8 illustrates schematic representations of the first and second reaction mechanisms during electrochemical cycling of hexacyanomanganate(II/I). During the first reaction, sodium cations are inserted into empty A sites until an A site occupancy of 1.0 is reached. During the second reaction, the addition of sodium cations at an A site occupancy greater than 1.0 results in a reordering of the sodium cations at the channel centers between the A sites.

Figure 9:
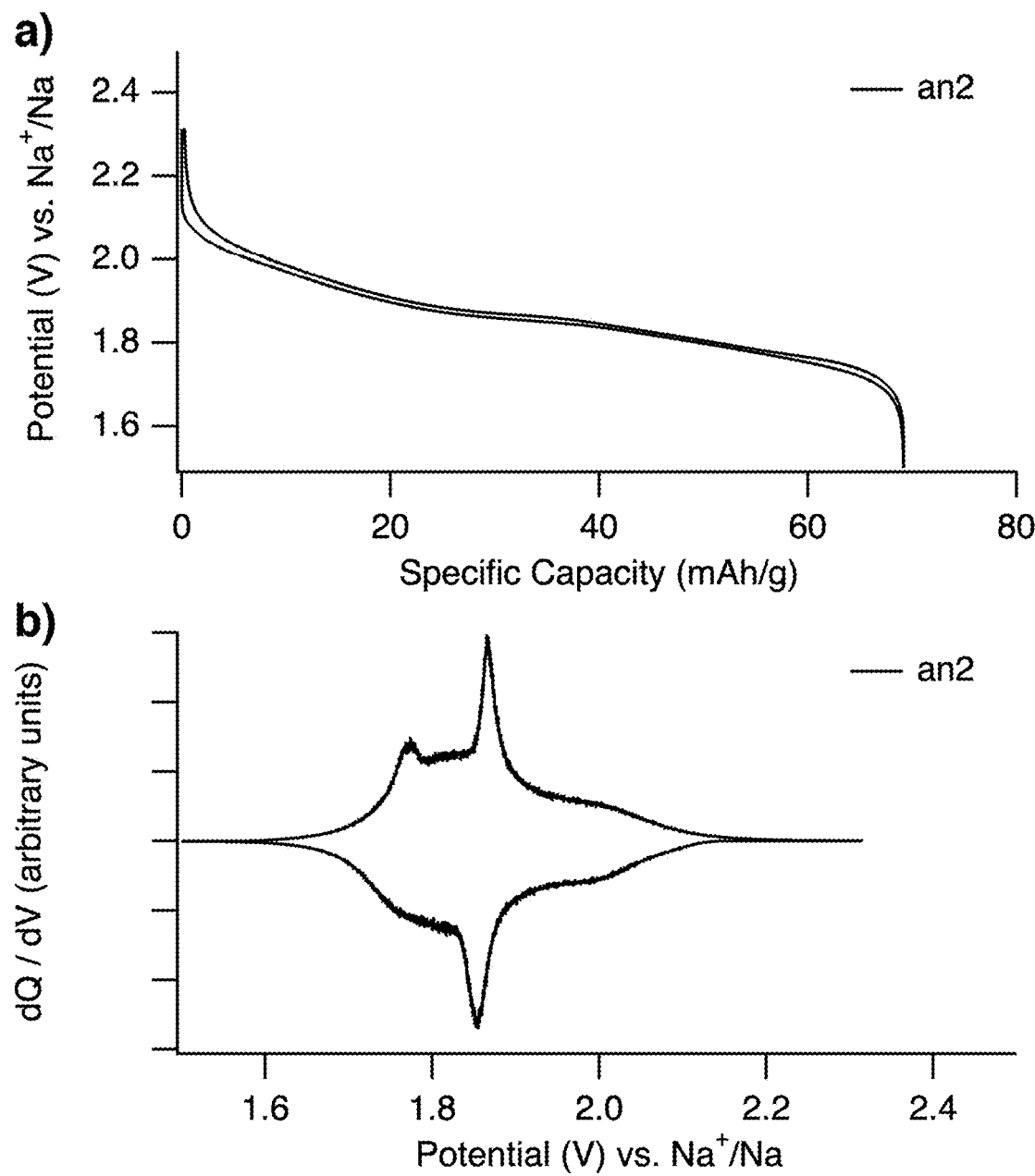
FIG. 9 illustrates a pair of panels relating to a material an2 including panel a) with a potential profile and panel b) with a differential coulometry spectrum.

FIG. 9 illustrates a pair of panels relating to a material an2 including panel a) with a potential profile and panel b) with a differential coulometry spectrum. Two clear peaks are clearly observed during discharging from low potential to high potential. One clear peak and one partially resolved peak are observed during charging from high potential to low potential.

Figure 10:
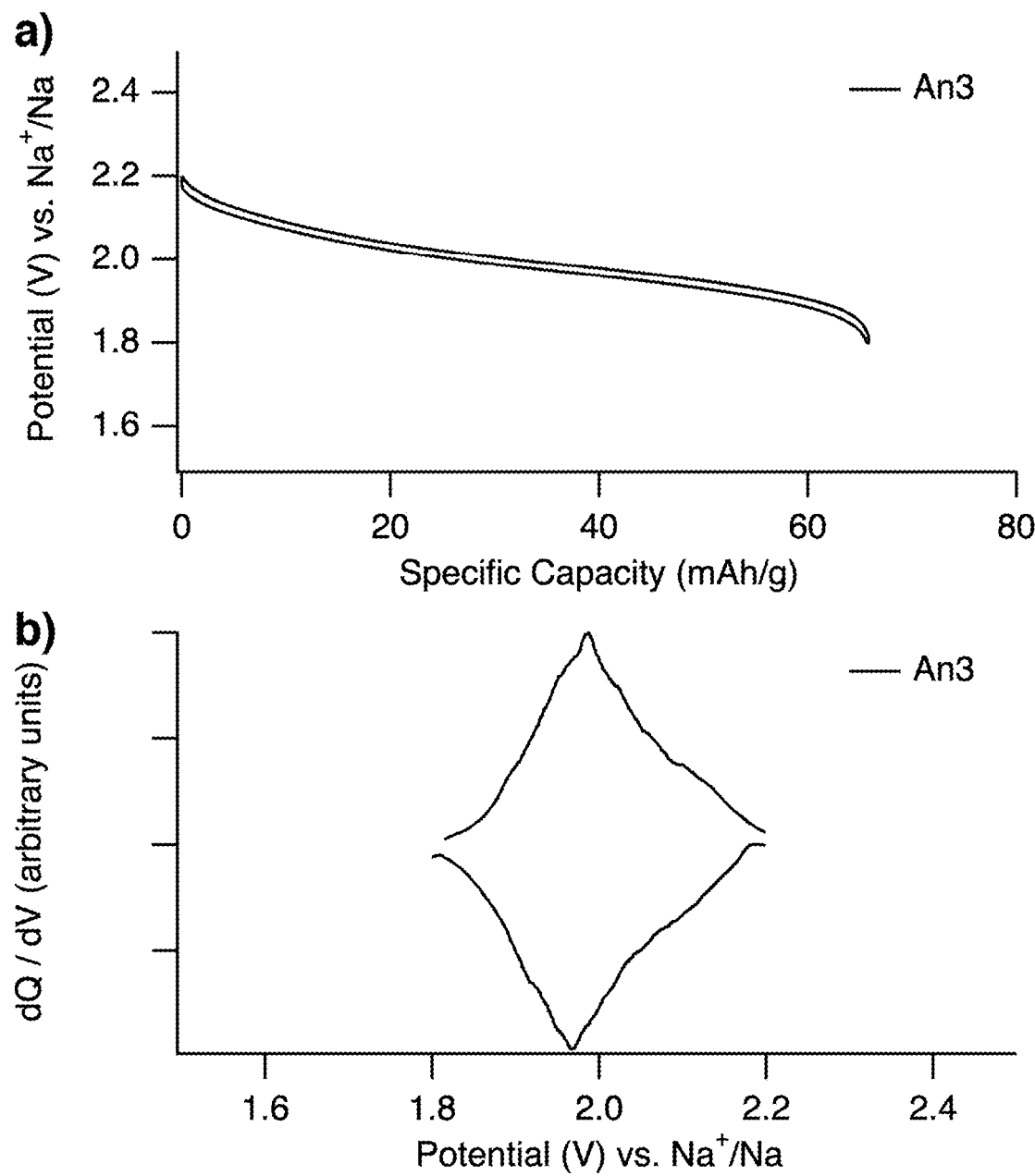
FIG. 10 illustrates a pair of panels relating to a material an3 including panel a) with a potential profile and panel b) with a differential coulometry spectrum.

FIG. 10 illustrates a pair of panels relating to a material an3 including panel a) with a potential profile and panel b) with a differential coulometry spectrum. A single peak is observed during each of charging and discharging.

Figure 11:
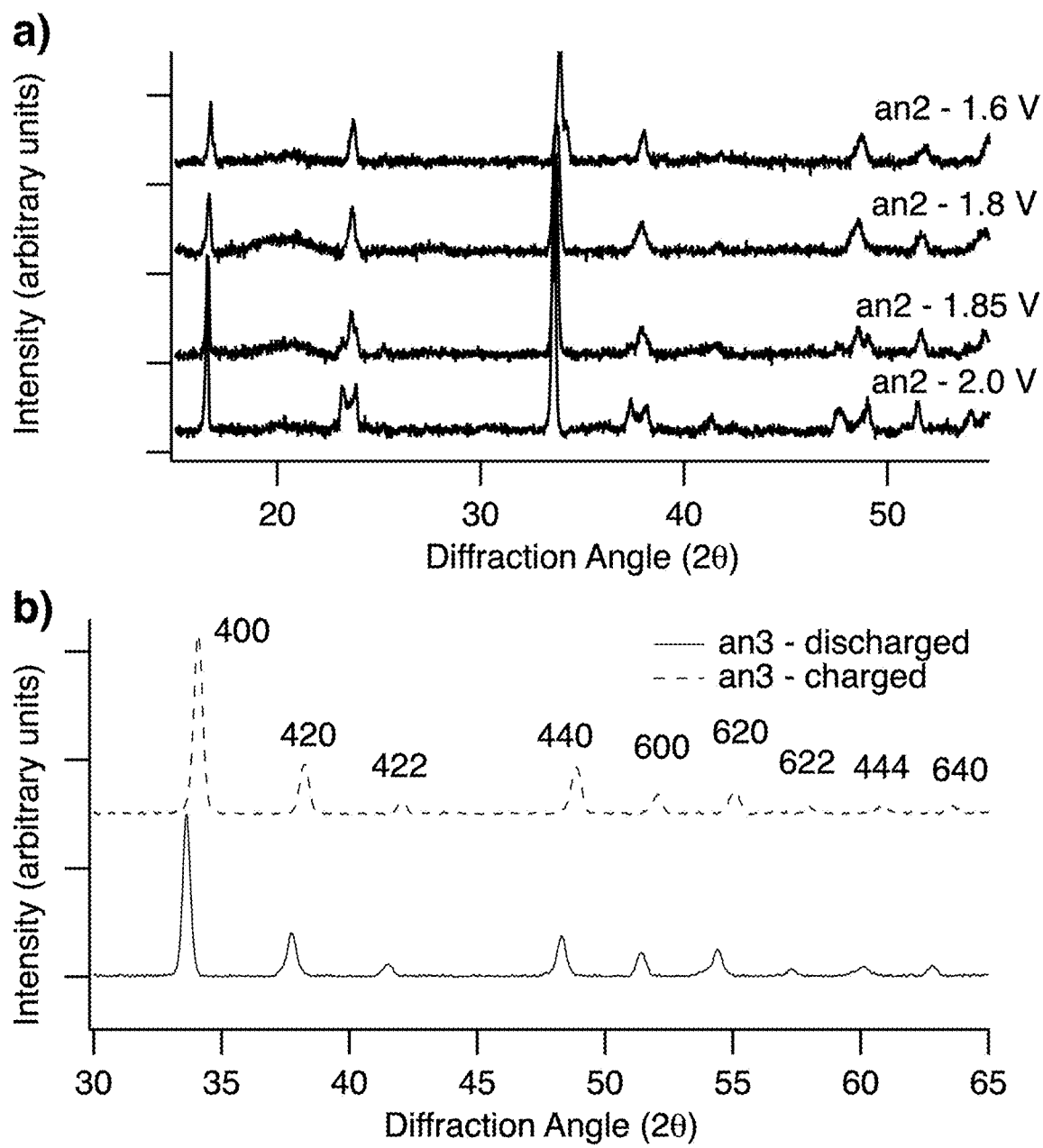
FIG. 11 illustrates a pair of panels including X-ray diffraction spectra of different materials at various states of charge including panel a) for material an2 and panel b) for material an3.

FIG. 11 illustrates a pair of panels including X-ray diffraction spectra of different materials at various states of charge including panel a) for material an2 and panel b) for material an3. No change in phase is observed.

Figure 12:
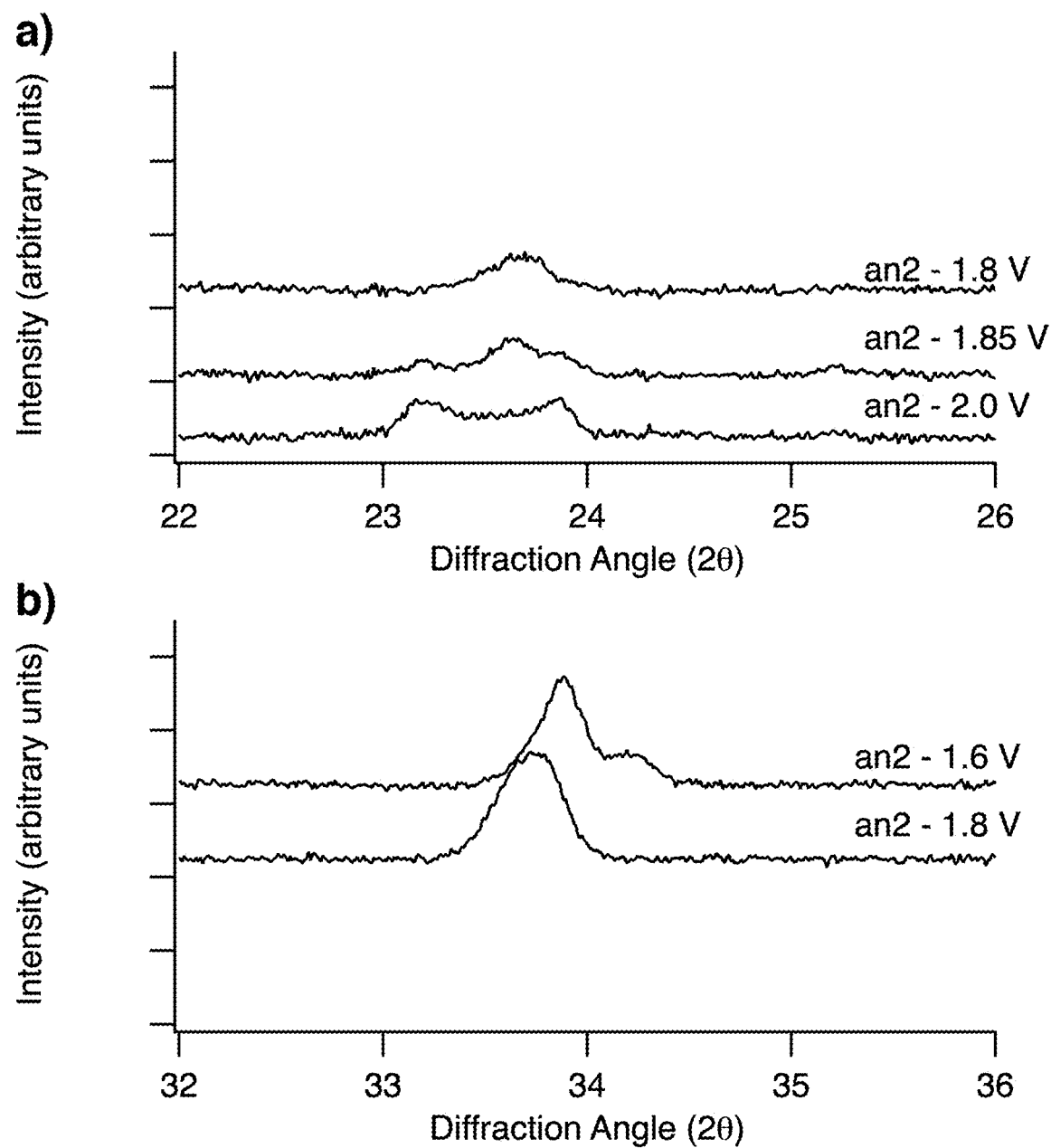
FIG. 12 illustrates a pair of panels with changes in the X-ray diffraction spectra of material an2 at differing potentials including panel a) of material an2 at potentials of 1.80 to 2.0 V and panel b) of material an2 at potentials of 1.60 to 1.80 V.

FIG. 12 illustrates a pair of panels with changes in the X-ray diffraction spectra of material an2 at differing potentials including panel a) of material an2 at potentials of 1.80 to 2.0 V and panel b) of material an2 at potentials of 1.60 to 1.80 V. Panel a): During charging from 2.0 V to 1.85 V, a third peak appears between the two peaks that are initially present, indicating partial conversion of the monoclinic phase to the cubic phase. At 1.80V, only this third peak remains, indicating full conversion to a cubic phase. Panel b): Further charging from 1.80 V to 1.60 V results in a splitting of the 400 peak into two closely spaced peaks, indicating the formation of a tetragonal phase.

The systems, methods, compositions, materials, and articles of manufacture above have been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

REFERENCES (THE FOLLOWING
REFERENCES ARE HEREBY EXPRESSLY
INCORPORATED BY REFERENCE THERETO
IN THEIR ENTIRETIES FOR ALL PURPOSES)

Reference [1]: U.S. Pat. No. 9,099,718 B2.
Reference [2]: Smith, A. J., et al. Electrochem. Solid-State Lett., 14 (4), A39-A41 (2011).
Reference [3]: Pasta, M., et al. Nature Communications, 5:3007 (2014). (Pas 14)
Reference [4]: Lee, H.-W., et al. Nature Communications, 5:5280 (2014). (Lee 14).

What is claimed as new and desired to be protected by Letters Patent of the United States is:

1. An electrochemical cell including a system having an anode, a cathode, and an electrolyte wherein the anode includes a material, comprising:
the material including at least one composition represented by Formula III:

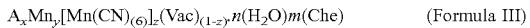

$A_x Mn_y[Mn(CN)_6]_z(Vac)_{(1-z)} \cdot n(H_2O) m(Che)$ (Formula III)

wherein, in Formula III, A includes one or more alkali metals including Na; and
wherein $0 < j \leq 4$, $0 \leq k \leq 0.1$, $1.2 \leq x \leq 4$, $0 < y \leq 1$, $0.8 < z \leq 1$, $0 < n \leq 4$; $0 \leq m \leq 0.2$ and
wherein $x + 2y - 4z = 0$; and
wherein said anode includes a concentration of A metals, said concentration of A metals including a first concentration of A metals x1, $x1 \geq 1.2$;
wherein Formula III includes one or more $Mn(CN)_6$ complexes each including an Mn atom; and wherein m is an average valence of said Mn atoms found in said one or more $Mn(CN)_6$ complexes; and wherein (Vac) identifies a $Mn(CN)_6$ vacancy, and wherein each particular $Mn(CN)_6$ complex includes said Mn atom bonded to a plurality of cyanide groups; and
wherein (Che) identifies a chelating group;
wherein an electrochemical charging of the system is configured to reduce one or more hexacyanomanganate groups from a discharged state of $Mn^{II}(CN)_6$ to a charged state of $Mn^I(CN)_6$,
and wherein said electrochemical charging proceeds by a plurality of electrochemical charging reactions, including a first electrochemical charging reaction configured to increase said concentration of A metals to a second concentration of A metals x2, where x2>x1, followed by a second electrochemical charging reaction configured to increase said concentration of A metals to a third concentration of A metals x3, where x3>x2.

2. The electrochemical cell of claim 1 wherein said first and said second electrochemical charging reactions each include reversible electrochemical charging reactions.

3. The electrochemical cell of claim 2 wherein the anode includes a monoclinic phase prior to an initiation of said electrochemical charging reactions and wherein the anode undergoes, during said first electrochemical charging reaction, a first anode reaction that includes a change in phase from said monoclinic phase to a cubic phase.

4. The electrochemical cell of claim 3 wherein the anode includes a cubic phase after said first electrochemical charging reaction and wherein the anode undergoes, during said second electrochemical charging reaction, a second anode reaction that includes a change in phase from said cubic phase to a tetragonal phase.

5. The electrochemical cell of claim 2 wherein the anode includes a cubic phase prior to an initiation of said second electrochemical charging reaction and wherein the anode undergoes, during said second electrochemical charging reaction, a second anode reaction that includes a change in phase from said cubic phase to a tetragonal phase.

6. The electrochemical cell of claim 2 in which said anode undergoes a change in phase from a cubic phase to a tetragonal phase during said second reaction.

7. The electrochemical cell of claim 2 in which a discharging process of the system is configured to produce an oxidation of hexacyanomanganate groups from a charged state of $Mn^I(CN)_6$ to a discharged state of $Mn^{II}(CN)_6$.

8. The electrochemical cell of claim 2 wherein the anode includes a capacity and wherein at least 90% of said capacity is achieved at a potential less than 1.9 V vs. $Na^+/Na^0$.

9. The electrochemical cell of claim 2 wherein the anode includes a capacity and wherein at least 90% of said capacity is achieved in a range of potentials less than 0.25 V.

10. The electrochemical cell of claim 1 wherein x2 is about equal to 2.0.

11. A method for operating an electrochemical cell having a system, the system including an anode, a cathode, and an electrolyte wherein the anode includes a material having at least one composition represented by Formula III:

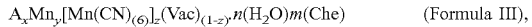

$A_x Mn_y[Mn(CN)_6]_z(Vac)_{(1-z)} \cdot n(H_2O) m(Che)$ (Formula III), comprising:
reducing one or more hexacyanomanganate groups of the material from a discharged state of $Mn^{II}(CN)_6$ to a charged state of $Mn^I(CN)_6$, using a first electrochemical charging reaction followed by a second electrochemical charging reaction, with said first electrochemical charging reaction increasing a concentration of A metals from a first concentration of A metals x1, $x1 \geq 1.2$ to a second concentration of A metals x2 with x2>x1, and with said second electrochemical charging reaction increasing said concentration of A metals to a third concentration of A metals x3, where x3>x2.

12. The method of claim 11 wherein said first and said second electrochemical charging reactions each include reversible electrochemical charging reactions.

13. The method of claim 12 wherein the anode includes a monoclinic phase prior to an initiation of said electrochemical charging reactions and wherein the anode undergoes, during said first electrochemical charging reaction, a first anode reaction that includes a change in phase from said monoclinic phase to a cubic phase.

14. The method of claim 13 wherein the anode includes a cubic phase after said first electrochemical charging reaction and wherein the anode undergoes, during said second electrochemical charging reaction, a second anode reaction that includes a change in phase from said cubic phase to a tetragonal phase.

15. The method of claim 12 wherein the anode includes a cubic phase prior to an initiation of said second electrochemical charging reaction and wherein the anode undergoes, during said second electrochemical charging reaction, a second anode reaction that includes a change in phase from said cubic phase to a tetragonal phase.

16. The method of claim 12 in which said anode undergoes a change in phase from a cubic phase to a tetragonal phase during said second reaction.

17. The method of claim 12 in which a discharging process of the system is configured to produce an oxidation of hexacyanomanganate groups from a charged state of $Mn^I(CN)_6$ to a discharged state of $Mn^{II}(CN)_6$.

18. The method of claim 12 wherein the anode includes a capacity and wherein at least 90% of said capacity is achieved at a potential less than 1.9 V vs. $Na^+/Na^0$.

19. The method of claim 12 wherein the anode includes a capacity and wherein at least 90% of said capacity is achieved in a range of potentials less than 0.25 V.

20. The method of claim 11 wherein x2 is about equal to 2.0.

* * * * *